(12) United States Patent
Rofe et al.

(10) Patent No.: US 11,626,760 B2
(45) Date of Patent: *Apr. 11, 2023

(54) SYSTEM AND METHOD FOR PROVIDING INDUCTIVE POWER AT MULTIPLE POWER LEVELS

(71) Applicant: POWERMAT TECHNOLOGIES LTD., Petach Tikva (IL)

(72) Inventors: Arik Rofe, Bet Hakerem (IL); Elieser Mach, Rosh Tzurim (IL); Oola Greenwald, Mevasseret Zion (IL); Guy Raveh, Mataa (IL); Moti Ashery, Jerusalem (IL); Ilya Gluzman, Holon (IL); Moti Kdoshim, Modiin (IL)

(73) Assignee: POWERMAT TECHNOLOGIES, LTD., Neve Ilan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/825,248

(22) Filed: May 26, 2022

(65) Prior Publication Data
US 2022/0285998 A1 Sep. 8, 2022

Related U.S. Application Data

(63) Continuation of application No. 17/498,569, filed on Oct. 11, 2021, now Pat. No. 11,349,353, which is a
(Continued)

(51) Int. Cl.
*H02J 50/12* (2016.01)
*H02J 50/80* (2016.01)
(Continued)

(52) U.S. Cl.
CPC .............. *H02J 50/12* (2016.02); *H01F 38/14* (2013.01); *H02J 50/80* (2016.02); *H02J 50/90* (2016.02)

(58) Field of Classification Search
CPC . H02J 50/12; H02J 50/80; H02J 50/90; H01F 38/14
(Continued)

(56) References Cited

U.S. PATENT DOCUMENTS

| 7,696,718 B2 | 4/2010 | Suzuki |
| 8,183,828 B2 | 5/2012 | Tanabe |

(Continued)

FOREIGN PATENT DOCUMENTS

| EP | 0838893 | 4/1998 |
| JP | 4946219 | 6/2012 |
| WO | 2009/116025 | 9/2009 |

OTHER PUBLICATIONS

Extended European Search Report dated Apr. 17, 2015 for European Patent Application No. 13813214.7.
(Continued)

*Primary Examiner* — Alfonso Perez Borroto
(74) *Attorney, Agent, or Firm* — Volpe Koenig

(57) ABSTRACT

A system and method for inductively providing electrical power at a plurality of power levels to electrical devices. The system may include an inductive power outlet unit conductively coupled to a power supply and an inductive power receiver unit associated with the electrical device. The inductive power outlet unit includes a driver device operable to generate power at a plurality of power levels and electrical power is transferred to the electrical device at a power level selected from the plurality of power levels, in accordance with electrical power requirements of the electrical device. The power receiver may be operable in a plurality of modes having a secondary inductor configured to operate selectively with a plurality of inductance values.

12 Claims, 17 Drawing Sheets

Related U.S. Application Data continuation of application No. 17/482,106, filed on Sep. 22, 2021, which is a continuation of application No. 16/989,226, filed on Aug. 10, 2020, now Pat. No. 11,183,888, which is a continuation of application No. 14/412,843, filed as application No. PCT/IL2013/050576 on Jul. 4, 2013, now Pat. No. 10,770,927.

(60) Provisional application No. 61/669,394, filed on Jul. 9, 2012, provisional application No. 61/668,250, filed on Jul. 5, 2012.

(51) Int. Cl.
*H01F 38/14* (2006.01)
*H02J 50/90* (2016.01)

(58) Field of Classification Search
USPC ..................................................... 307/104
See application file for complete search history.

(56) References Cited

U.S. PATENT DOCUMENTS

| | | | |
|---|---|---|---|
| 8,320,143 B2 | 11/2012 | Leibovitz | |
| 8,509,808 B2 | 8/2013 | Krutt et al. | |
| 8,890,470 B2* | 11/2014 | Partovi | H02J 50/402 |
| | | | 320/108 |
| 8,981,598 B2 | 3/2015 | Azancot et al. | |
| 8,983,373 B2 | 3/2015 | Buczek | |
| 9,178,570 B2* | 11/2015 | Deluca | H01M 10/48 |
| 11,349,353 B2* | 5/2022 | Rofe | H02J 50/12 |
| 2002/0190835 A1 | 12/2002 | Ma et al. | |
| 2007/0247880 A1 | 10/2007 | Kwon et al. | |
| 2009/0096413 A1 | 4/2009 | Partovi et al. | |
| 2009/0153098 A1 | 6/2009 | Toya et al. | |
| 2010/0007307 A1 | 1/2010 | Baarman et al. | |
| 2010/0066176 A1 | 3/2010 | Azancot et al. | |
| 2010/0259217 A1 | 10/2010 | Baarman et al. | |
| 2011/0065398 A1 | 3/2011 | Liu et al. | |
| 2011/0260549 A1 | 10/2011 | Jung et al. | |
| 2012/0034867 A1 | 2/2012 | Griffin et al. | |
| 2012/0193993 A1 | 8/2012 | Azancot et al. | |
| 2012/0217819 A1 | 8/2012 | Yamakawa et al. | |
| 2012/0217971 A1* | 8/2012 | Deluca | H04B 5/0031 |
| | | | 324/426 |
| 2012/0220224 A1* | 8/2012 | Walker | H04W 12/06 |
| | | | 455/41.1 |
| 2013/0178154 A1* | 7/2013 | Zhu | H04B 5/0012 |
| | | | 29/601 |
| 2013/0189923 A1 | 7/2013 | Lewin | |

OTHER PUBLICATIONS

International Search Report for International Application No. PCT/IL2013/050576 dated Oct. 29, 2013.
International Preliminary Report on Patentability for International Application No. PCT/IL2013/050576 dated Jan. 6, 2015.
Notice of Allowance for U.S. Appl. No. 17/482,106 dated Nov. 17, 2022.
Notice of Allowance for U.S. Appl. No. 17/482,106 dated Jan. 17, 2023.
Notice of Allowance for U.S. Appl. No. 17/482,106 dated Feb. 28, 2023.

* cited by examiner

SYSTEM AND METHOD FOR PROVIDING INDUCTIVE POWER AT MULTIPLE POWER LEVELS

CROSS REFERENCE TO RELATED APPLICATION(S)

This patent application is a continuation of co-pending U.S. patent application Ser. No. 17/498,569, filed Oct. 11, 2021, which is a continuation of co-pending U.S. patent application Ser. No. 17/482,106, filed Sep. 22, 2021, which is a continuation of co-pending U.S. patent application Ser. No. 16/989,226, filed Aug. 10, 2020 (now U.S. Pat. No. 11,183,888, issued Nov. 23, 2021), which is a continuation of U.S. patent application Ser. No. 14/412,843, filed Jan. 5, 2015 (now U.S. Pat. No. 10,770,927, issued Sep. 8, 2020), which in turn is a National Stage filing under 35 U.S.C. § 371 of PCT Patent Application No. PCT/IL2013/050576, filed Jul. 4, 2013, which is based upon and claims priority to U.S. Provisional Patent Application Ser. No. 61/668,250, filed Jul. 5, 2012 and to U.S. Provisional Patent Application Ser. No. 61/669,394, filed Jul. 9, 2012, the disclosures of each of which are incorporated herein by reference.

FIELD OF INVENTION

The present disclosure relates to a system and method for inductively providing AC electrical power to an electrical device at non-resonant frequencies of an inductive power transfer system. The disclosure further relates to multi-mode inductive power receivers operable in accordance with a plurality of operating protocols.

BACKGROUND

Inductive power coupling allows energy to be transferred from a power supply to an electric load without a wired connection therebetween. An oscillating electric potential is applied across a primary inductor. This sets up an oscillating magnetic field in the vicinity of the primary inductor. The oscillating magnetic field may induce a secondary oscillating electrical potential in a secondary inductor placed close to the primary inductor. In this way, electrical energy may be transmitted from the primary inductor to the secondary inductor by electromagnetic induction without a conductive connection between the inductors.

When electrical energy is transferred from a primary inductor to a secondary inductor, the inductors are said to be inductively coupled. An electric load wired in series with such a secondary inductor may draw energy from the power source wired to the primary inductor when the secondary inductor is inductively coupled thereto.

In order to control inductive power transfer between an inductive power outlet and an inductive power receiver various protocols have been suggested to enable regulation of power level and the like. For example, one such protocol is described in the applicant's co-pending U.S. patent application Ser. No. 13/205,672 titled "Energy Efficient Inductive Power Transmission System and Method," now U.S. Pat. No. 8,981,598, which is incorporated herein by reference.

It is known in the art that inductive power transfer systems transfer AC electrical power at the resonant frequency of the inductive power transfer system. However, small fluctuations in the resonant frequency during power transmissions may result in substantive changes and losses in the transferred electrical power. Fluctuations in the inductive resonant frequency may be due to changing environmental conditions or variations in alignment between primary inductive and secondary inductive coils.

Further, efficient inductive power transfer is only practical where the inductive receiver uses the same protocol as the inductive power outlet. Inductive receivers are generally configured to work according to only one control protocol. However, because of the variety of protocols currently in use, not all inductive receivers are compatible with all inductive power outlets.

Thus, there is a need in the art for an inductive power transfer system with a higher tolerance to environmental fluctuations and variations in inductive coil alignment and to low voltages transmissions, as well as a need in the art of an inductive power receiver operable to work according to multiple control protocols.

SUMMARY

The present disclosure provides a system and method for inductively providing electrical power at a plurality of power levels to electrical devices.

In the present disclosure, an inductive power transfer system provides electrical power to an electrical device. The inductive power transfer system includes, inter alia, an inductive power outlet unit conductively coupled to a power supply and an inductive power receiver unit associated with the electrical device. The inductive power outlet unit includes, inter alia, a primary inductor conductively coupled to the power supply via a driver device. The power supply may supply a DC current to the driver device. The driver device is configured to convert the input DC voltage to an AC voltage. The frequency of the transferred AC voltage is determined by a toggling frequency, $f_T$, of the driver device. The toggling frequency, $f_T$, is optionally selected such that the AC voltage has a voltage transmission frequency, f, which may be higher or lower than the resonant frequency, $f_R$, of the power inductive system. Thus, deviations of the transmission frequency from the resonant frequency of the inductive power transfer system, do not result in large variations in the transferred voltage. Optionally, in accordance with a selected embodiment of the present disclosure, a range of toggle frequencies is selected, such that the transferred power has an approximate "linear dependency" on the AC transmission frequency. The AC electrical power is supplied to the electrical device, in accordance with electrical power requirements of the electrical device.

The driver device may include a plurality of electronic switches configured and operable to be selectively activated such that the driver device is operable to generate power at a plurality of power levels and electrical power is transferred to the electrical device at a power level selected from the plurality of power levels, in accordance with electrical power requirements of the electrical device.

Variously, the driver device may include, inter alia, a power converter, which optionally includes, inter alia, four electronic switches, such as N-Type MOFSET devices and the corresponding control microprocessors or drivers. Each pair of electronic switches may be controlled by a control microprocessor. The electronic switches are conductively coupled to the DC power supply. The four switches constitute a full-bridge (H-bridge) power inverter for converting the DC voltage into the AC voltage. The full-bridge power converter includes a first half-bridge power converter, which includes a first pair of the electronic switches and its corresponding microprocessor and a second half-bridge power converter, which includes a second pair of electronic switches and a corresponding control microprocessor. An LC circuit conductively links the first half-bridge converter and the second half-bridge converter.

In accordance with a selected embodiment of the present disclosure, in a first power mode, by operating the first half-bridge and the second half-bridge, sequentially, a square-wave AC voltage, with a voltage range of ±V volts, where V volts is the DC supply voltage, is generated. Accordingly, a voltage range of ±V volts may be generated over a resonant LC circuit. Additionally or alternatively, in a second power mode, by only operating a single bridge-member of the power converter, a square-wave AC voltage, with a voltage range from 0 volts to V volts is generated.

Furthermore, by varying the DC voltage supply, the present disclosure provides a versatile electrical power source for different electrical devices, each electrical device having its particular varying electrical power requirements. Additionally or alternatively, the duty cycle of the square wave may be adjusted to vary the amount of transmitted energy, as required.

It is appreciated that for electrical devices which require a DC voltage for operation, an AC-DC rectification is included in the system.

There is provided in accordance with a selected embodiment of the present disclosure, an inductive power transfer system including at least one inductive power outlet unit including at least one primary inductor conductively coupled to a power supply via a driver device. The driver device is configured to provide an oscillating voltage across the at least one primary inductor, the at least one primary inductor forming an inductive couple with at least one secondary inductor associated with an electrical device, the at least one secondary inductor associated with an inductive power receiver. The AC voltage is inductively transferred to the inductive power receiver unit such that electrical power at the plurality of power levels is transferred to the electrical device, in accordance with electrical power requirements of the electrical device.

There is provided in accordance with another selected embodiment of the present disclosure, a method for inductively transferring electrical power to an electrical device, including providing at least one inductive power outlet unit including at least one primary inductor, providing a driver device conductively associated with a power supply, configuring the driver device to provide an AC voltage across the at least one primary inductor, the at least one primary inductor forming an inductive couple with at least one secondary inductor associated with an inductive power receiver unit and configuring the power receiver unit to provide an induced AC voltage to an electrical device conductively coupled with the power receiver unit, in accordance with electrical power requirements of the electrical device.

Further in accordance with a selected embodiment of the present disclosure, the driver device includes a power inverter for converting a DC voltage generated by a DC power supply to the AC voltage. The power converter includes a first electronic switch being operable to selectively conductively couple an anode of the DC power supply to a first terminal of the primary inductor, a second electronic switch being operable to selectively conductively couple a cathode of the DC power supply to the first terminal of the primary inductor, a third electronic switch being operable to selectively conductively couple the anode of the DC power supply to a second terminal of the primary inductor, and a fourth electronic switch being operable to selectively conductively couple the cathode of the DC power supply to the second terminal of the primary inductor. The power inverter is toggled between a first operational state and a second operational state, the AC voltage is generated across the primary inductor at least one power level of the plurality of power levels.

Still further in accordance with a selected embodiment of the present disclosure, at a first power mode of the driving AC voltage, the first operational state includes the first electronic switch being operable in an ON-state, the second electronic switch being operable in an OFF-state, the third electronic switch being operable in an OFF-state, and the fourth electronic switch being operable in an ON-state. The second operational state includes the first electronic switch being operable in an OFF-state, the second electronic switch being operable in an ON-state, the third electronic switch being operable in an ON-state, and the fourth electronic switch being operable in an OFF-state.

Additionally in accordance with a selected embodiment of the present disclosure, at a second power mode of the AC voltage, the first operational state includes the first electronic switch being operable in an ON-state, the second electronic switch being operable in an OFF-state, the third electronic switch being operable in an OFF-state, and the fourth electronic switch being operable in an ON-state. The second operational state includes the first electronic switch being operable in an OFF-state, the second electronic switch being operable in an ON-state, the third electronic switch being operable in an OFF-state, and the fourth electronic switch being operable in an ON-state.

Further in accordance with a selected embodiment of the present disclosure, the first power mode and the second power mode are characterized by a common range of toggle frequencies, voltages, duty cycle variations, or the like.

Still further in accordance with a selected embodiment of the present disclosure, the toggling frequencies include a frequency range in which the induced AC voltage varies approximately linearly with the toggle frequencies.

Additionally in accordance with a selected embodiment of the present disclosure, the driver device is configured to adjust the toggle frequencies in response to feedback signals.

The feedback signals include data pertaining to the electrical power requirements of the electrical device.

Further in accordance with a selected embodiment of the present disclosure, the toggling frequencies are selected in accordance with the electrical power requirements of the electrical device.

Further in accordance with a selected embodiment of the present disclosure, the inductive power receiver unit further includes a power monitor inductively coupled to the secondary inductor and configured to monitor the electrical power transferred to the secondary inductor and a feedback signal generator conductively coupled to the power monitor and configured to adjust the toggling frequencies in accordance with the monitoring thereby ensuring that the inductive power transfer system transfers the electrical power to the electrical device in accordance with the electrical power requirements, Additionally in accordance with a selected embodiment of the present disclosure, the inductive power transfer system further including an AC-DC rectifier conductively coupling the power receiver unit and the electrical device and configured to rectify the induced AC voltage thereby supplying a DC voltage to the electrical device, in accordance with the electrical power requirements of the electrical device.

Optionally, the electrical device includes at least one of the following electrical devices: a mobile communications device, a navigation system, a computing device, a laptop computer, a net-book, a tablet computer, an electronic reading device, a media player, or the like as well as any combination thereof.

Further in accordance with a selected embodiment of the present disclosure, the electronic switch device is a MOFSET device. Additionally or alternatively, the electronic switch device may be a bipolar transistor, such as a junction transistor or the like.

The present disclosure further provides for an inductive power receiver operable in a plurality of modes such that it may be compatible with inductive power outlets operating with various protocols. The present disclosure addresses this need.

According to one aspect of the disclosure, an inductive power transfer system is presented comprising at least one multi-mode inductive power receiver operable to receive power from at least one inductive power outlet, wherein the inductive power receiver is operable in a plurality of modes, the multi-mode inductive power receiver comprising at least one secondary inductor configured to operate selectively with a plurality of inductance values.

Optionally, the secondary inductor comprises a plurality of terminals configured to connect to a reception circuit and wherein the inductance between a first pair of the terminals has a first value and the inductance between a second pair of the terminals has a second value.

Where appropriate, the secondary inductor comprises at least a common terminal, a first mode terminal, and a second mode terminal wherein the first pair of terminals comprises the common terminal and the first mode terminal, and the second pair of terminals comprises the common terminal and the second mode terminal. For example, where appropriate, the inductance between the first pair of terminals is about 7.5 microhenries, and the inductance between the second pair of terminals is about 3.2 microhenries.

Optionally, the inductive power transfer system further comprises a mode selector operable to select at least one of a plurality of operating protocols. The mode selector may be operable to connect a reception circuit to the secondary inductor with at least one of the plurality of inductances. Variously, the mode selector comprises at least one AC switch operable to connect a reception circuit to a selected terminal of the secondary inductor. For example, the AC switch comprises a pair of N-channel FETs having a common source signal, and a pair of P-channel FETs having a common gate signal and configured to connect the reception circuit to a selected terminal of the secondary inductor, wherein the common gate signal of the P-channel FETs is drawn from a charge pump via the pair of N-channel FETs.

Where appropriate the mode selector may be in communication with a frequency detector operable to detect operating frequency of the primary inductor. Accordingly, the mode selector may be operable to select a first operating mode if the operating frequency is above a threshold value, and to select a second operating mode if the operating frequency is below the threshold value. Other decision mechanisms will occur to those skilled in the art.

According to certain examples, the secondary inductor comprises a spiral of conducting material having an inner terminal at an inner end of the spiral, an outer terminal at an outer end of the spiral and an intermediate terminal conductively connected to the conducting material of the spiral at an intermediate point between the inner end and the outer end. Optionally, the spiral of conducting material has an inner diameter of about 20 millimeters and an outer diameter of about 33 millimeters. The spiral may comprise 14 windings between the inner terminal and the outer terminal and 8 windings between the intermediate terminal and the outer terminal. Accordingly, the inductance at 100 kilohertz and 1 volt between the inner terminal and the outer terminal may be about 7.5 microhenries, and the inductance at 100 kilohertz and 1 volt between the intermediate terminal and the outer terminal is about 3.2 microhenries. Furthermore, the direct current resistance between the inner terminal and the outer terminal is about 298 milliohms, and the direct current resistance between the intermediate terminal and the outer terminal is about 188 milliohms.

Another aspect of the disclosure is to teach a method for transferring power inductively comprising inducing a voltage in a secondary inductor, detecting operating frequency of the induced voltage; if the operating frequency is above a threshold value, selecting a first operating mode, and if the operating frequency is below the threshold value, selecting a second operating frequency. Optionally, the threshold value is 250 kilohertz. Other data protocols between the transmitter and receiver as suitable requirements will occur to those skilled in the art.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit, or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data, or the like. Additionally or alternatively, the data processor may access a non-volatile storage, for example, a magnetic hard-disk, flash-drive, removable media, or the like, for storing instructions and/or data. Optionally, a network connection may additionally or alternatively be provided. User interface devices may be provided such as visual displays, audio output devices, tactile outputs, and the like. Furthermore, as required user input devices may be provided such as keyboards, cameras, microphones, accelerometers, motion detectors, or pointing devices such as mice, roller balls, touch pads, touch sensitive screens, or the like.

BRIEF DESCRIPTION OF THE DRAWING(S)

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

Figure 3:
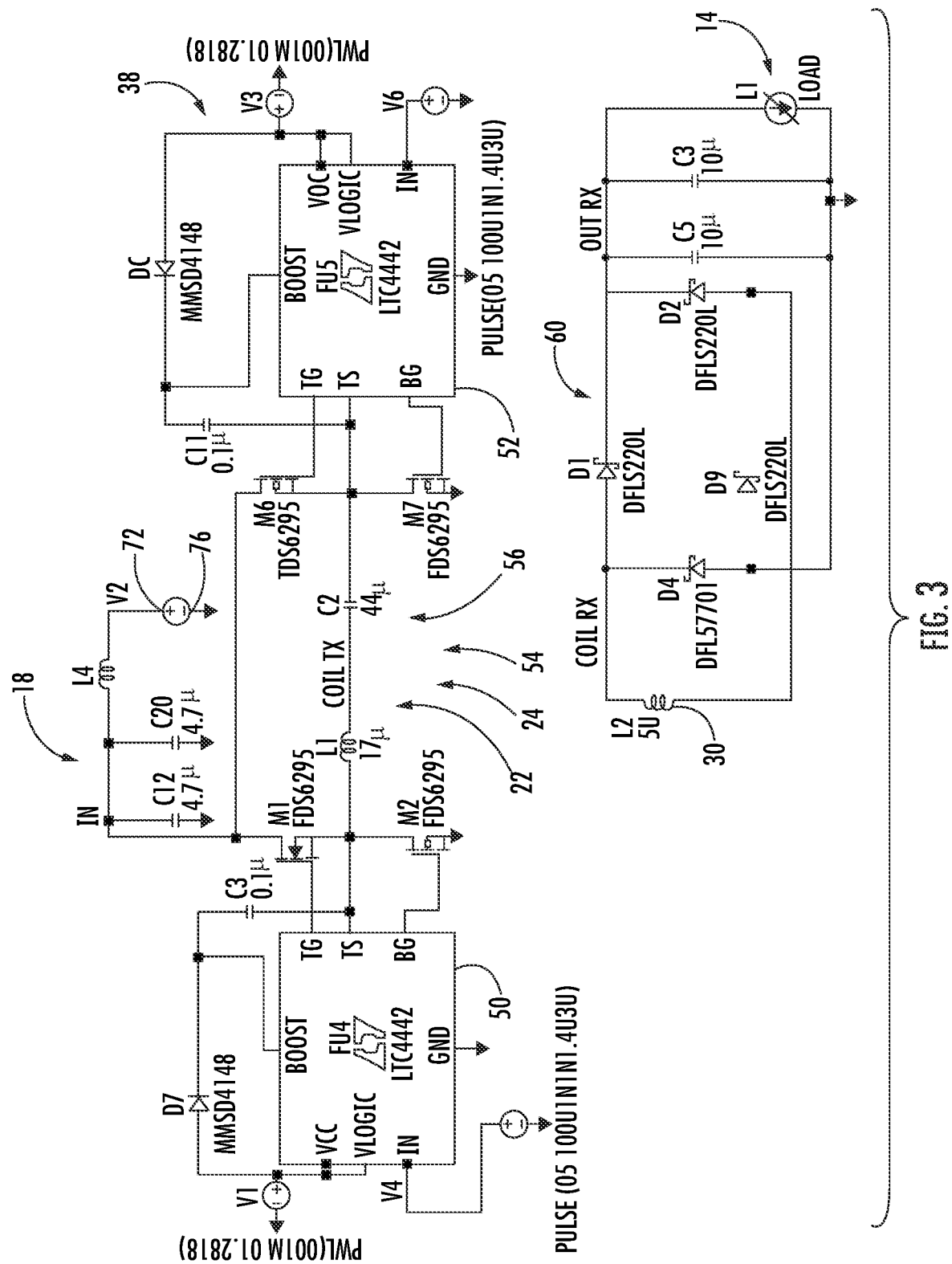
Figure 4:
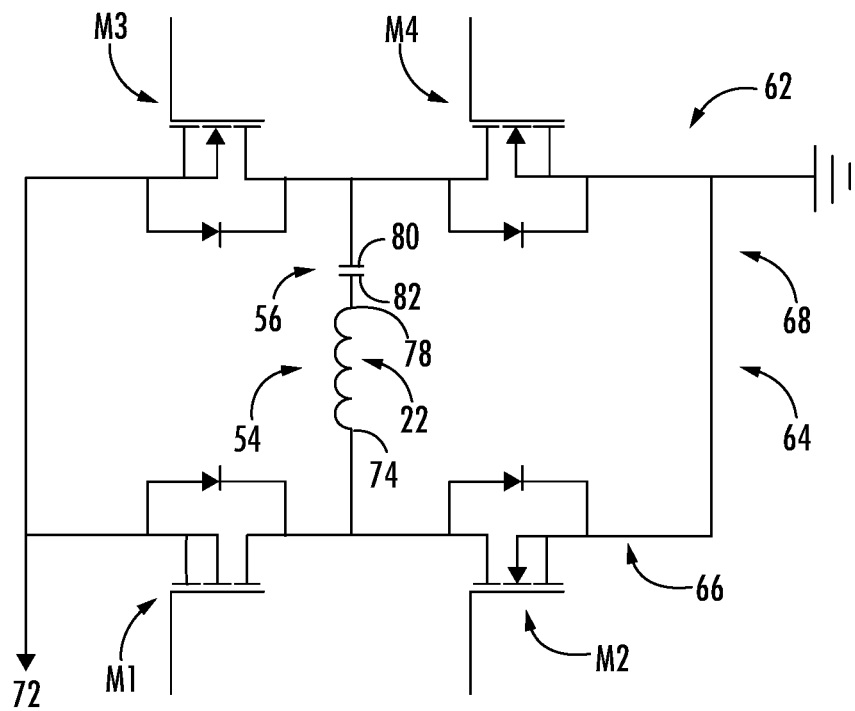
Figure 5:
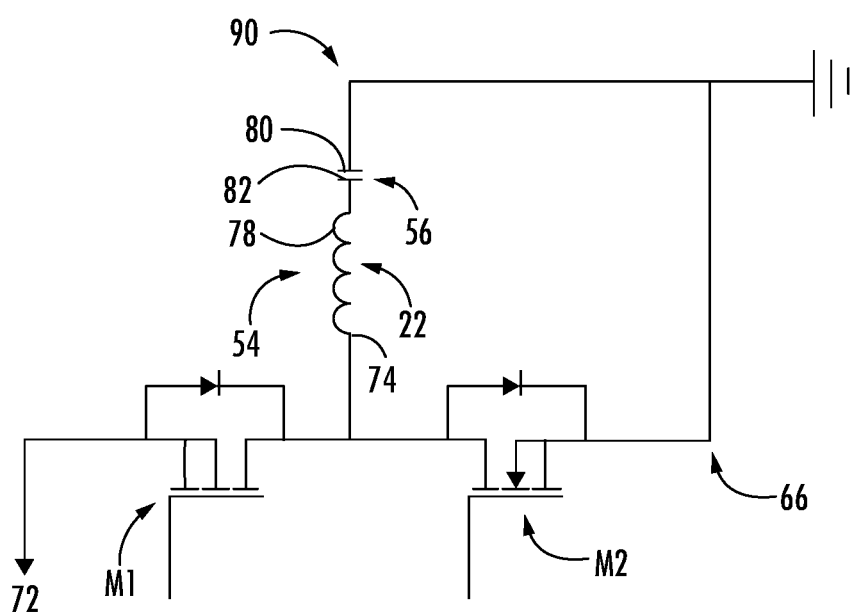
Figure 6A:
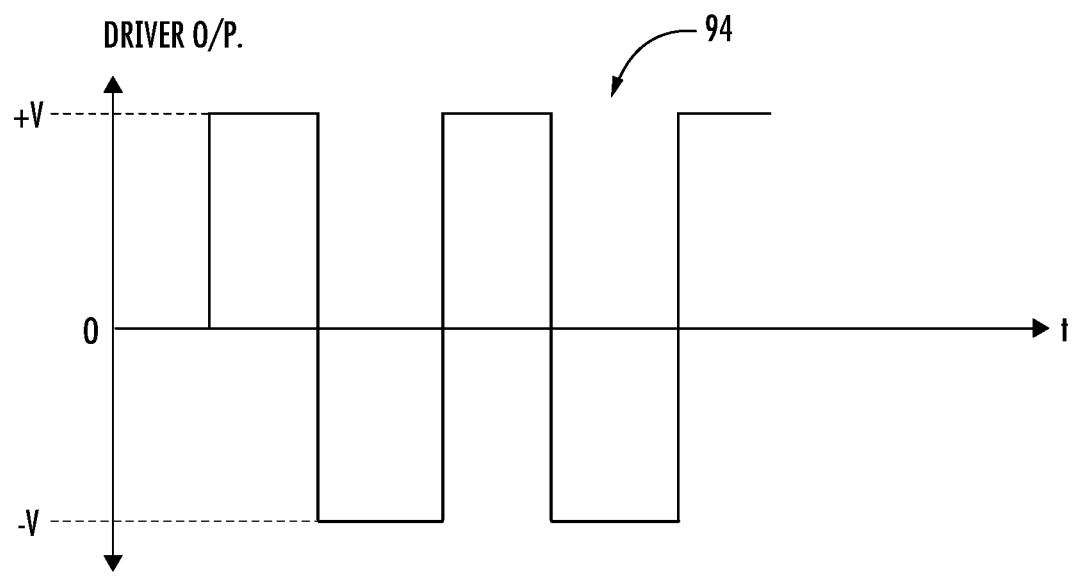
Figure 6B:
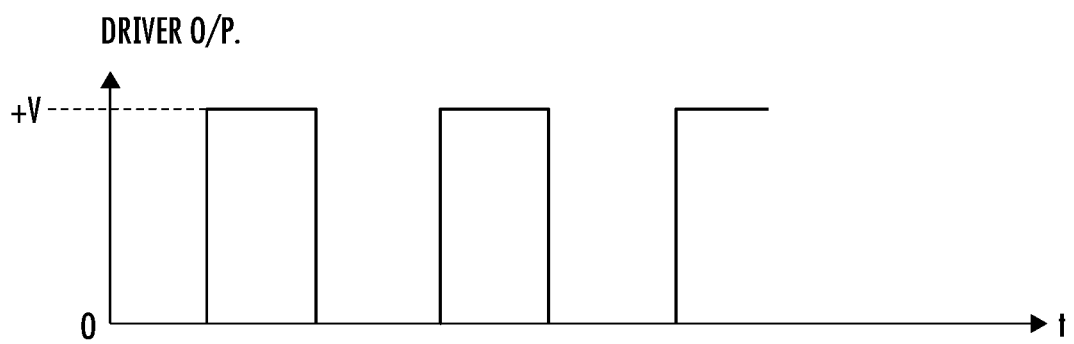
Figure 7:
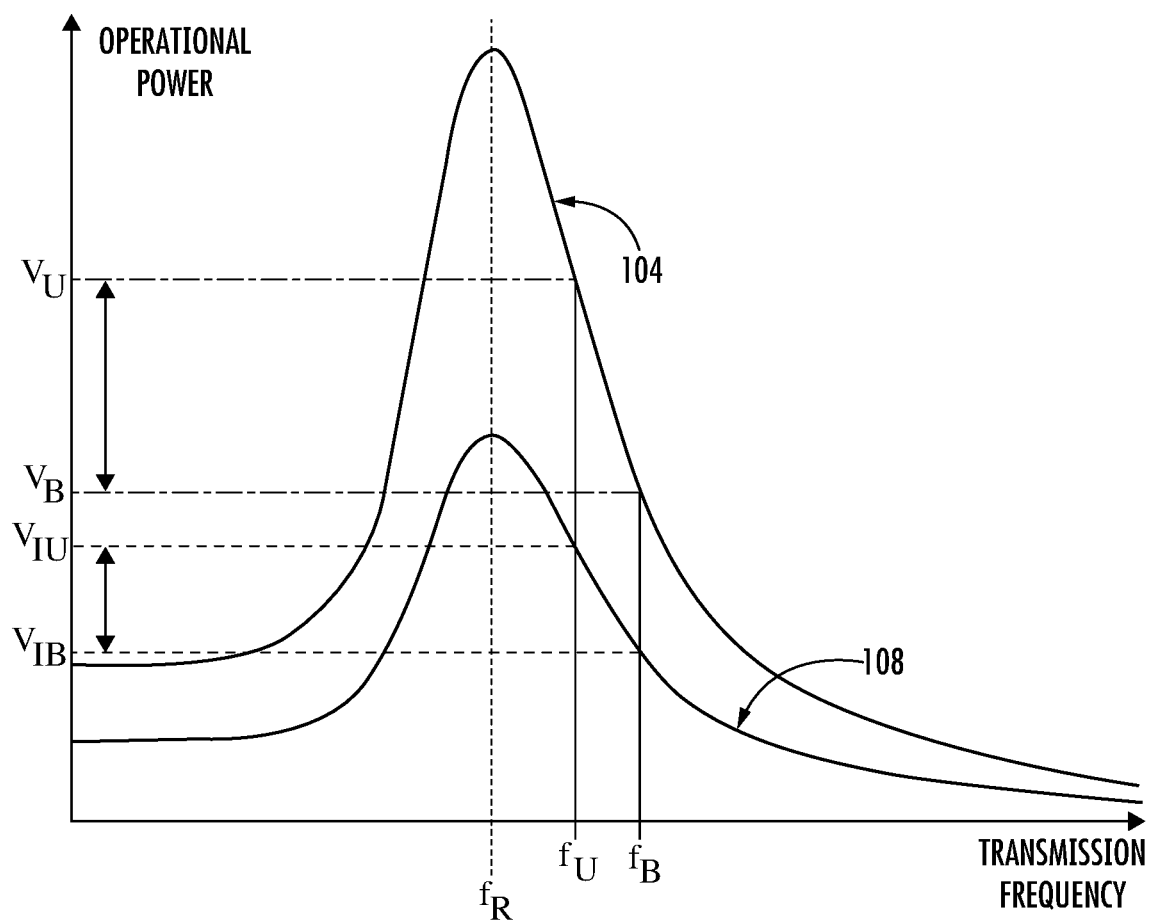
Figure 8:
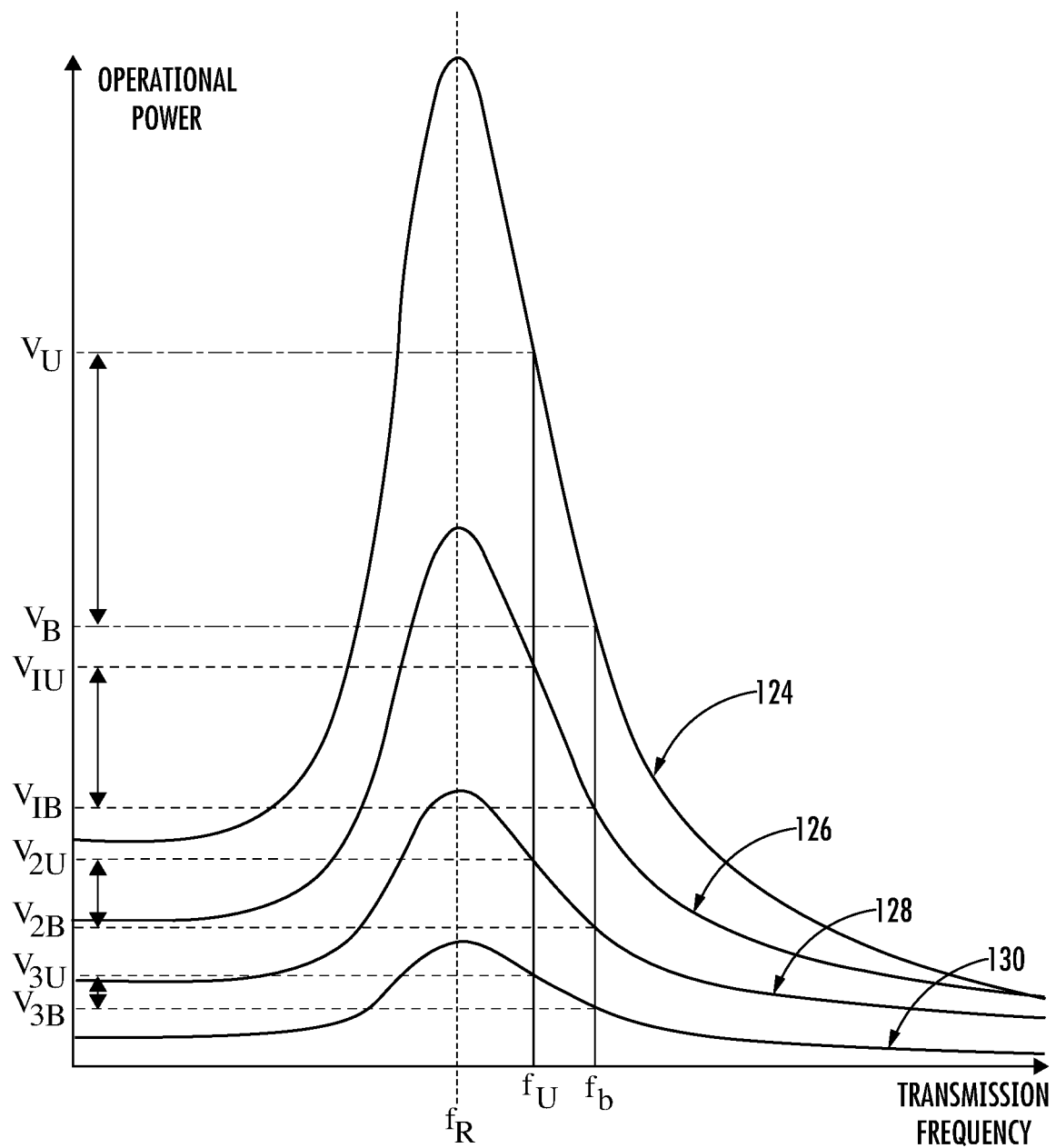
Figure 9:
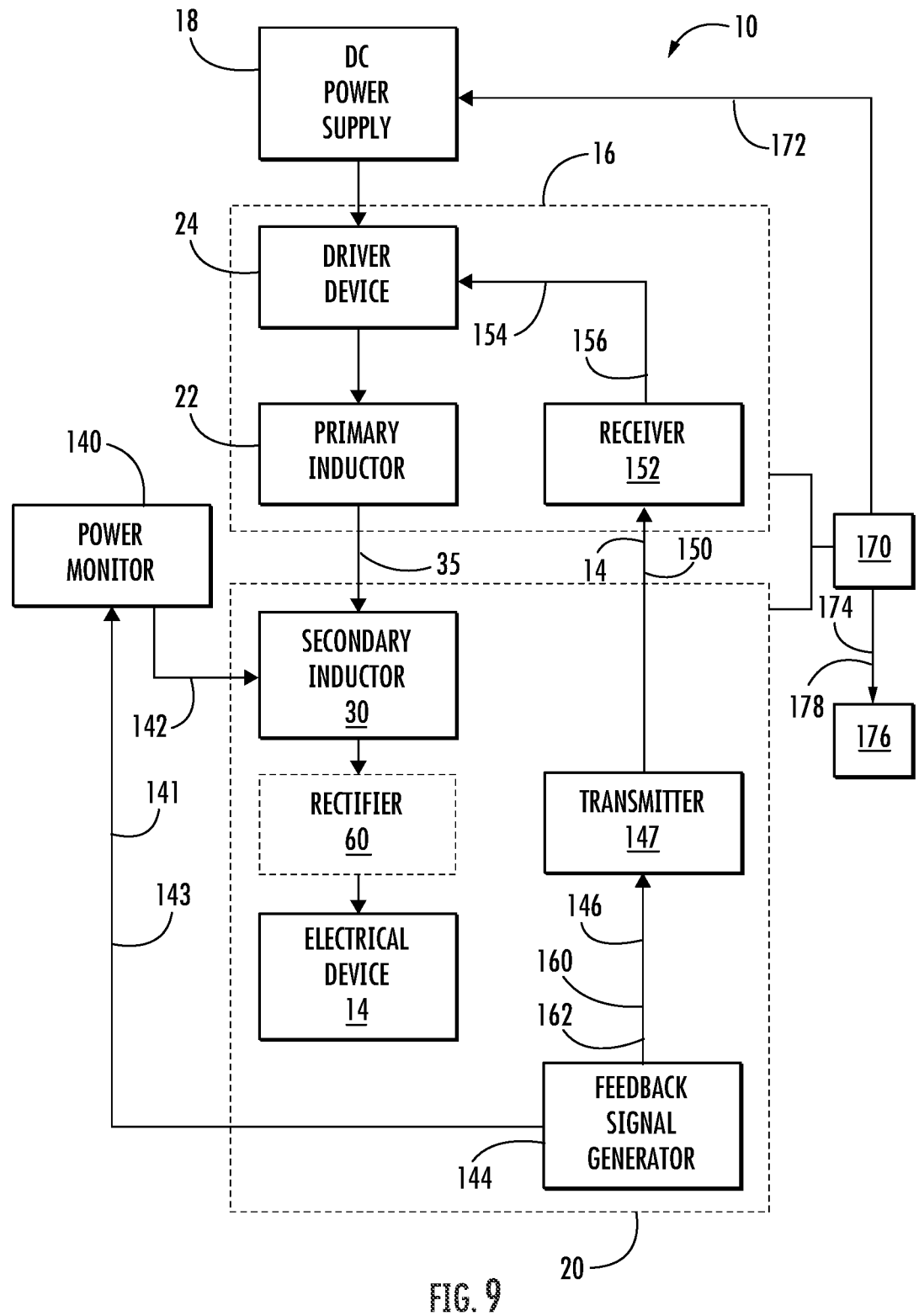
Figure 10:
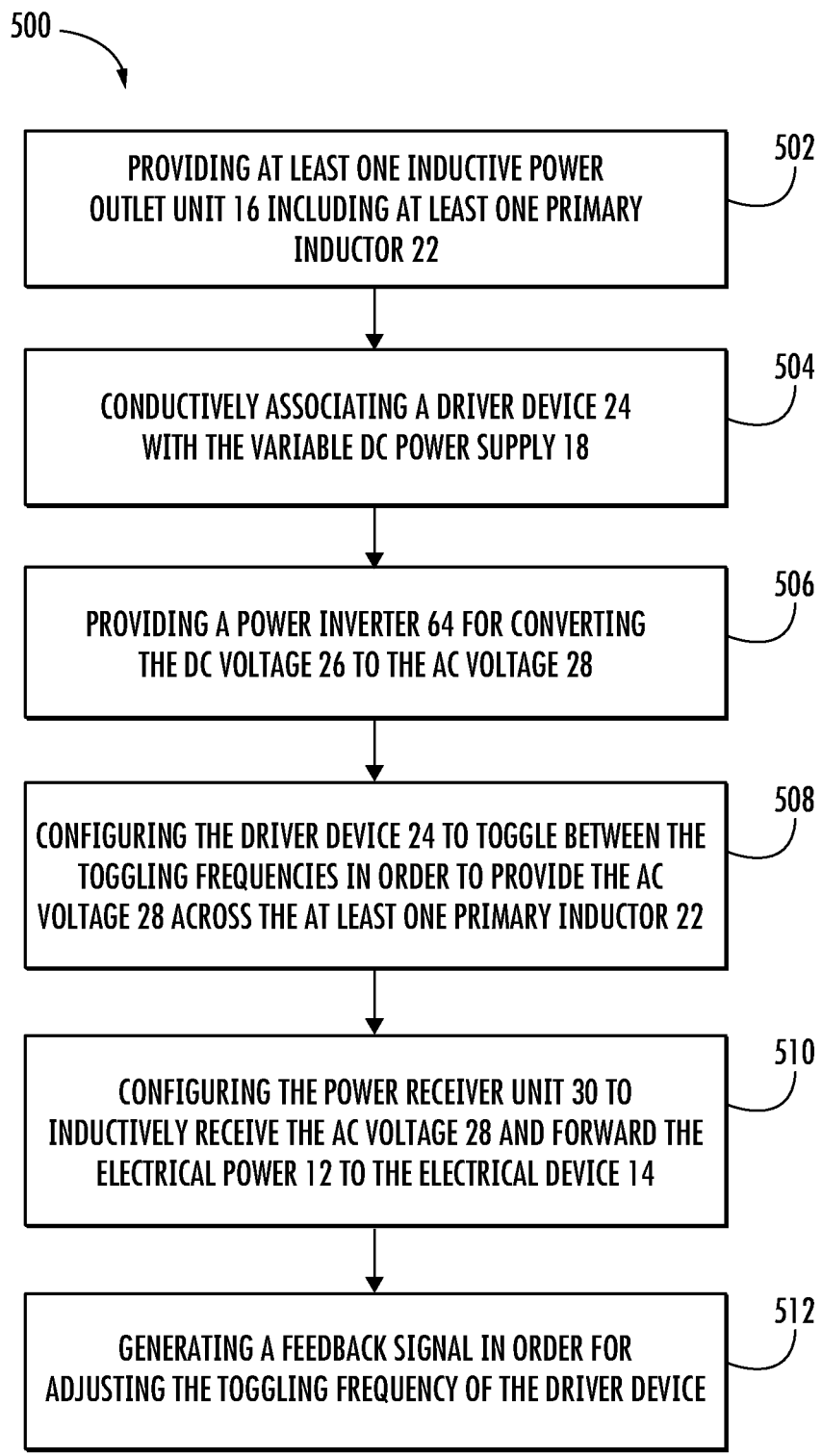
Figure 11:
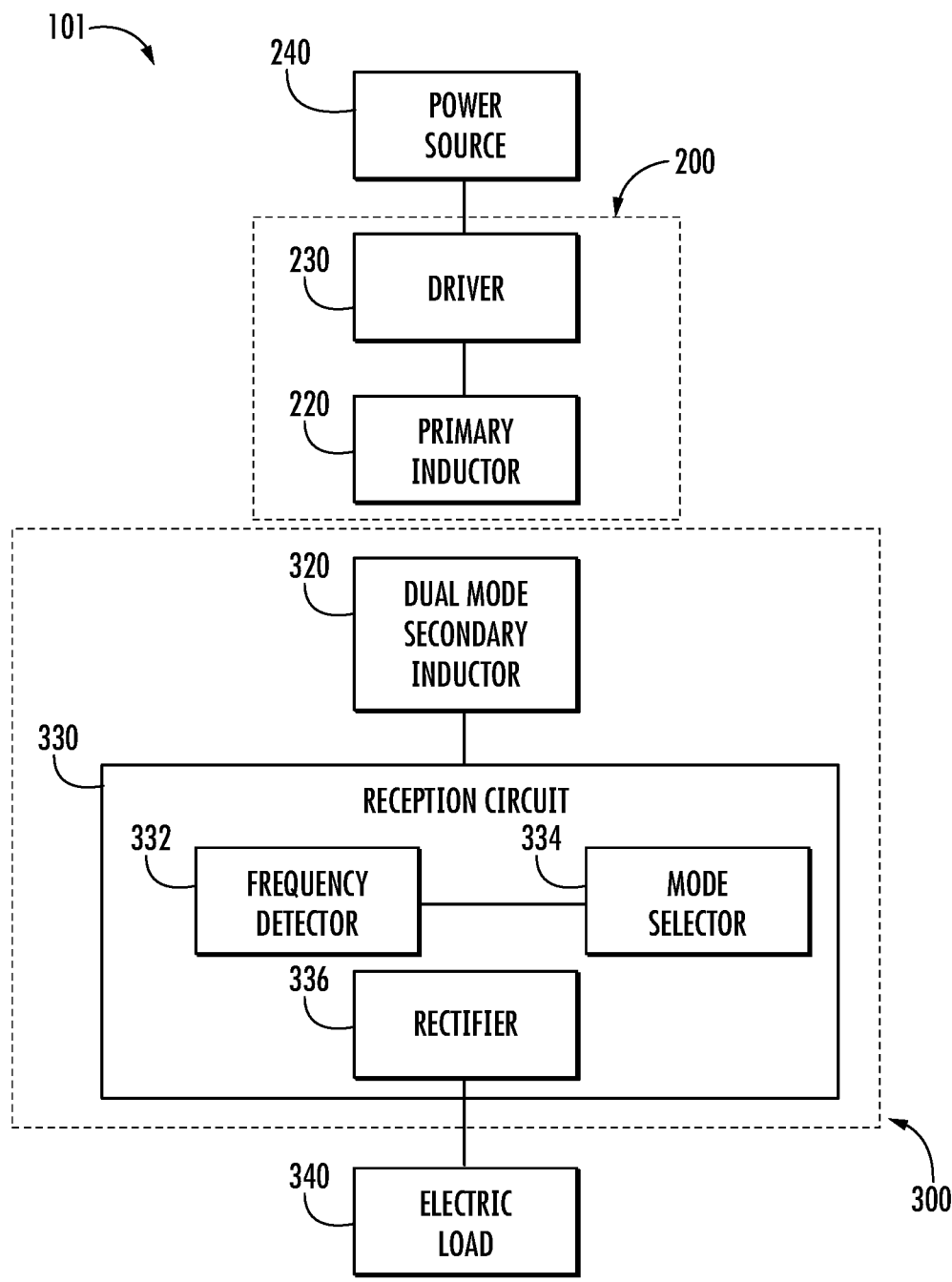
Figure 12A:
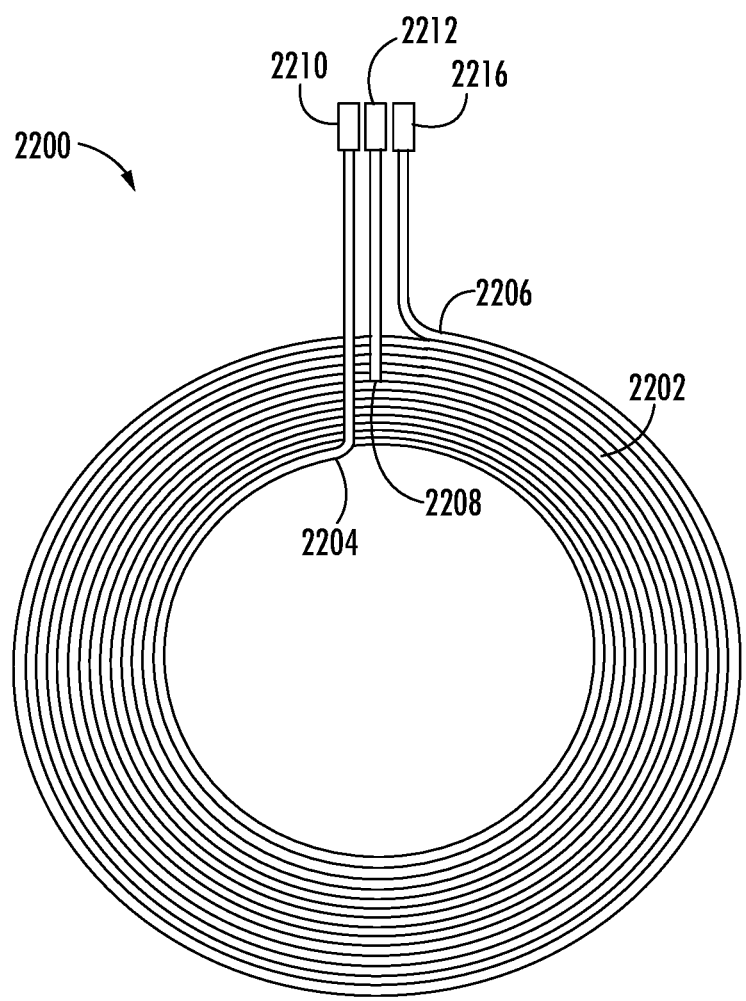
Figure 12B:
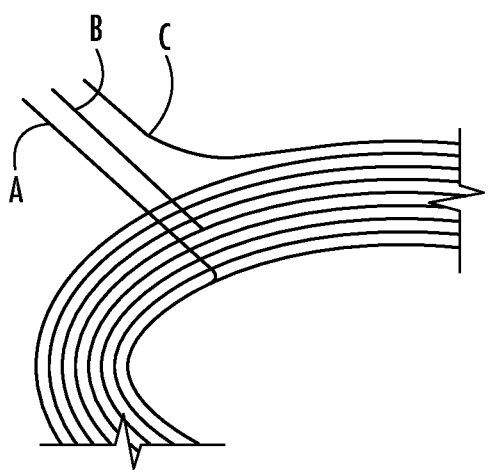
Figure 13:
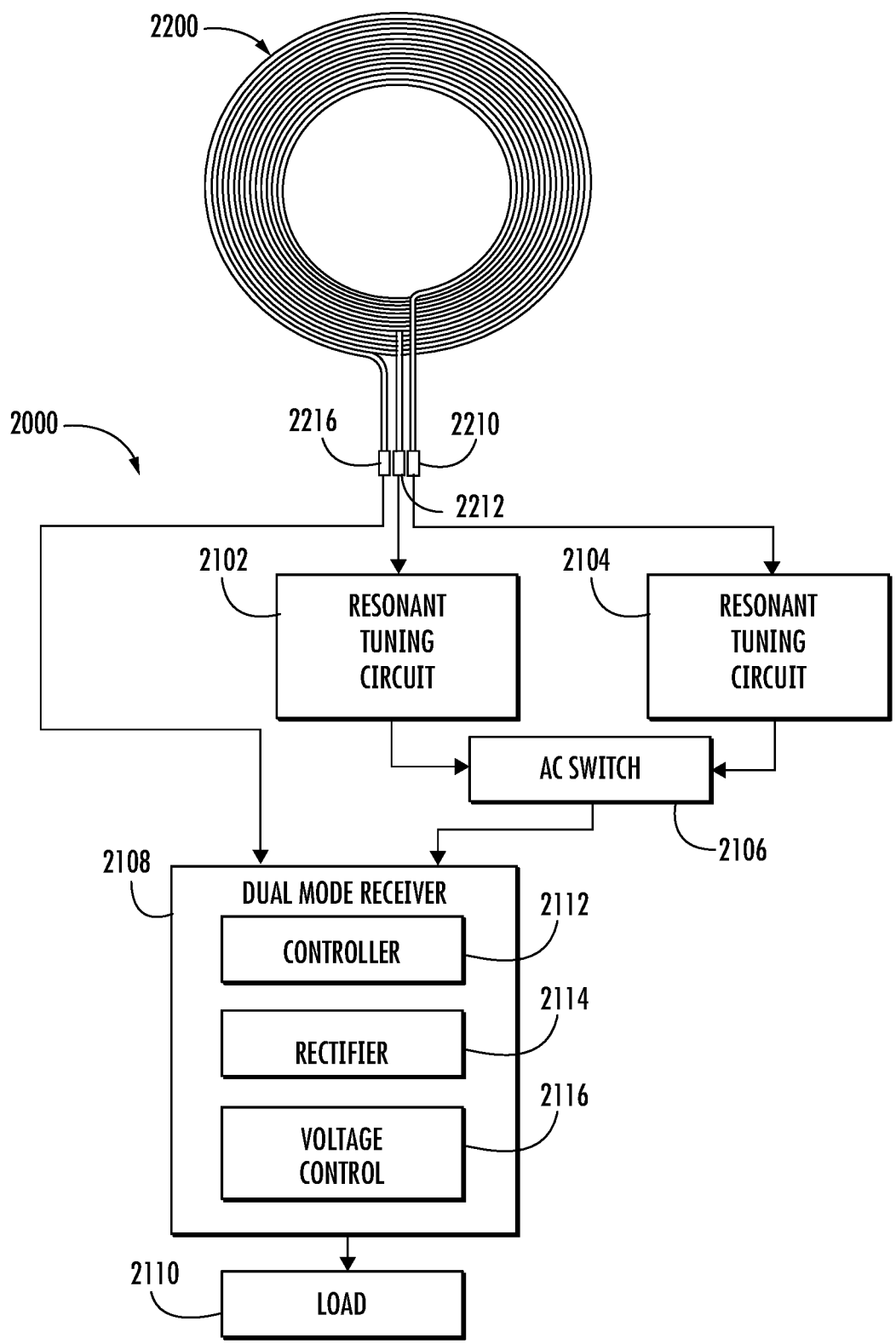
Figure 14A:
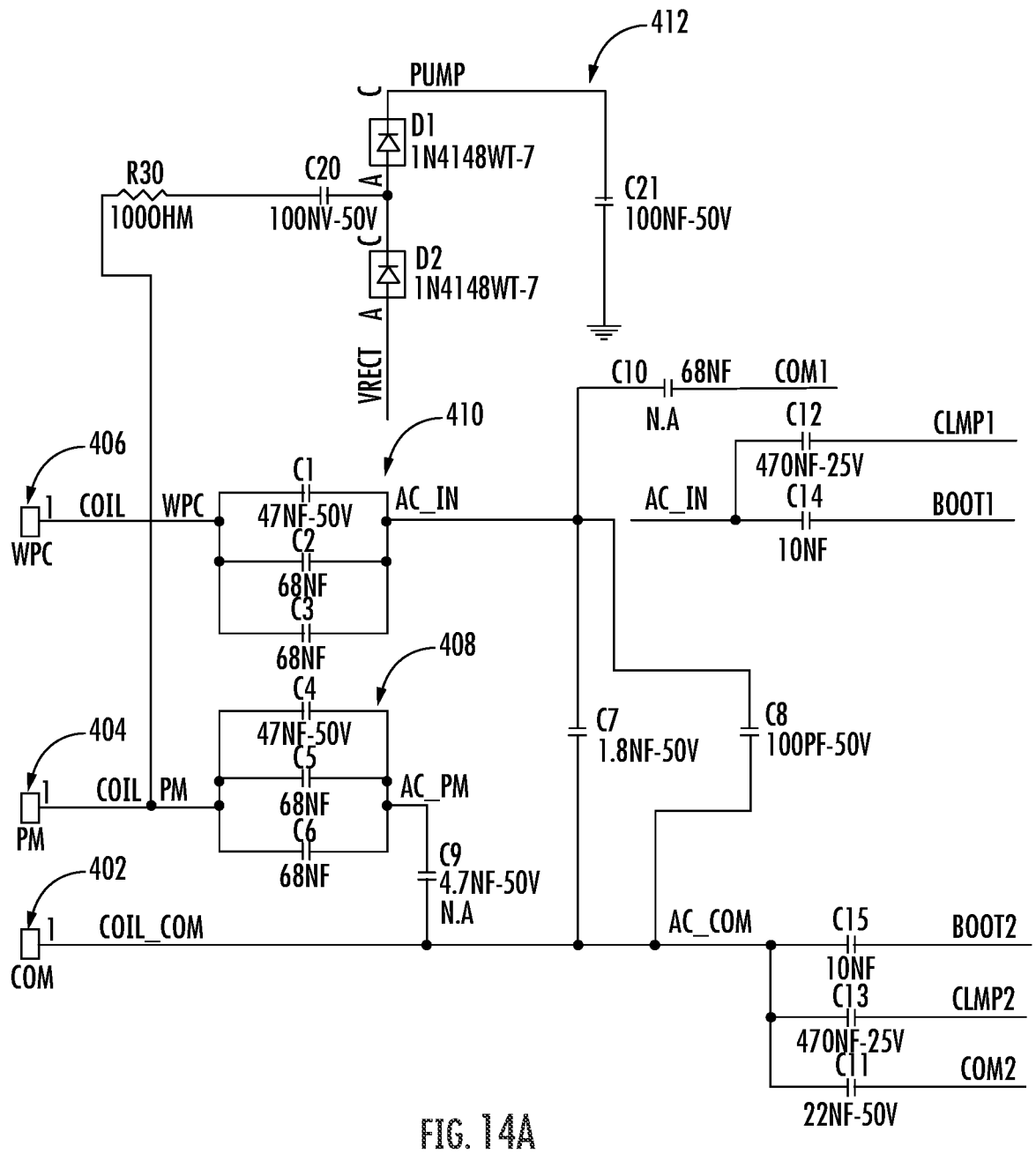
Figure 14B:
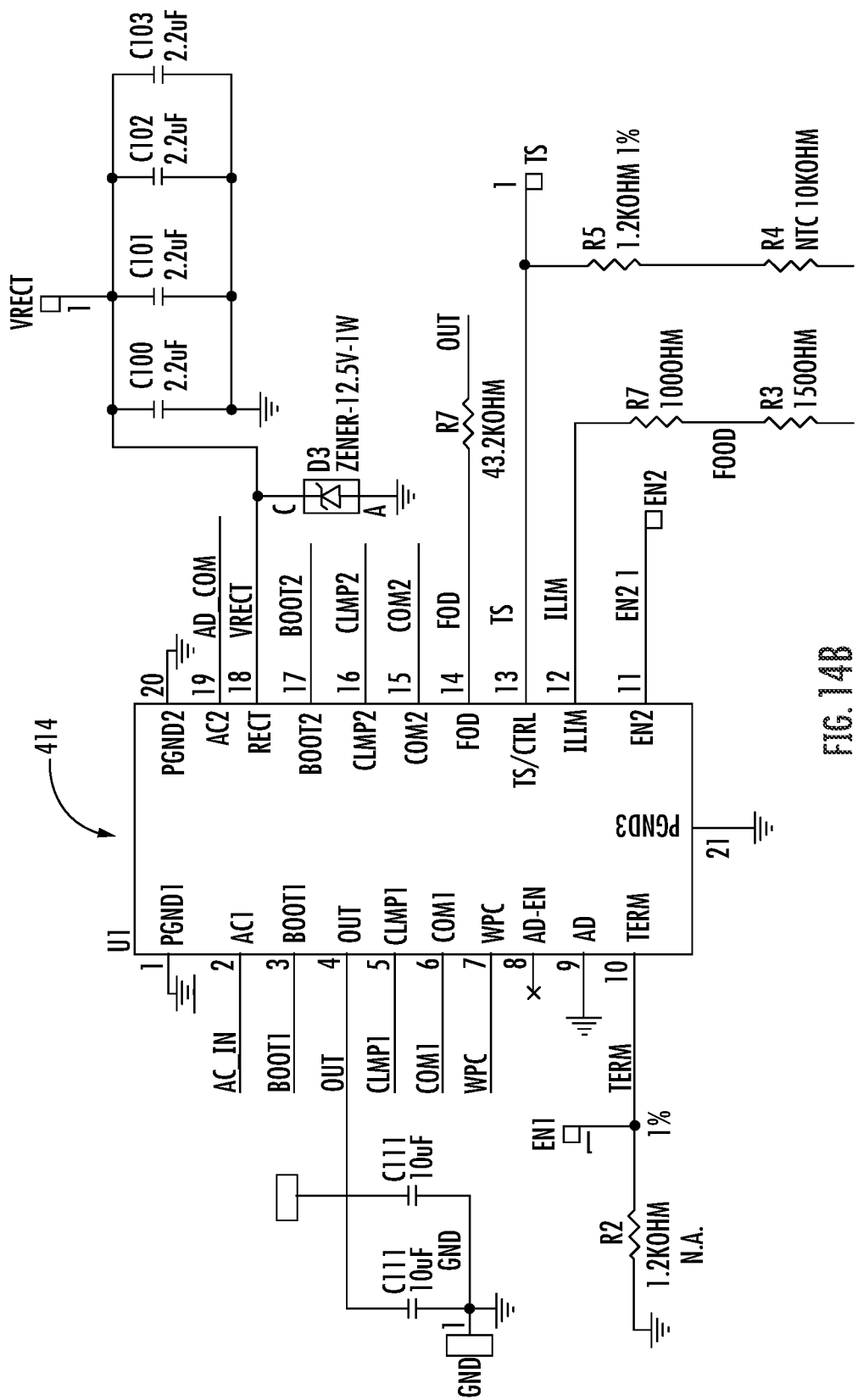
Figure 14C:
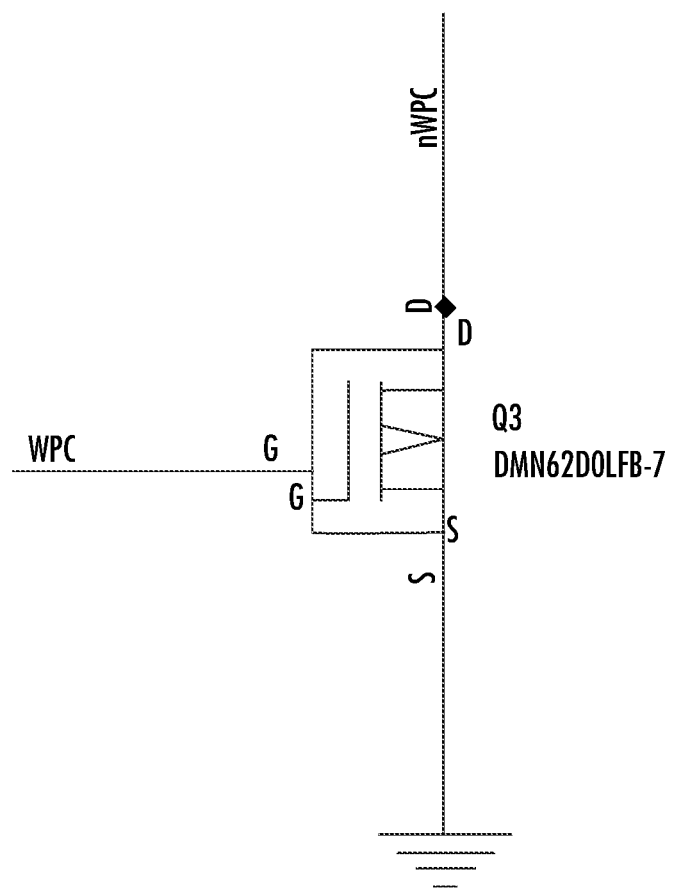
Figure 14D:
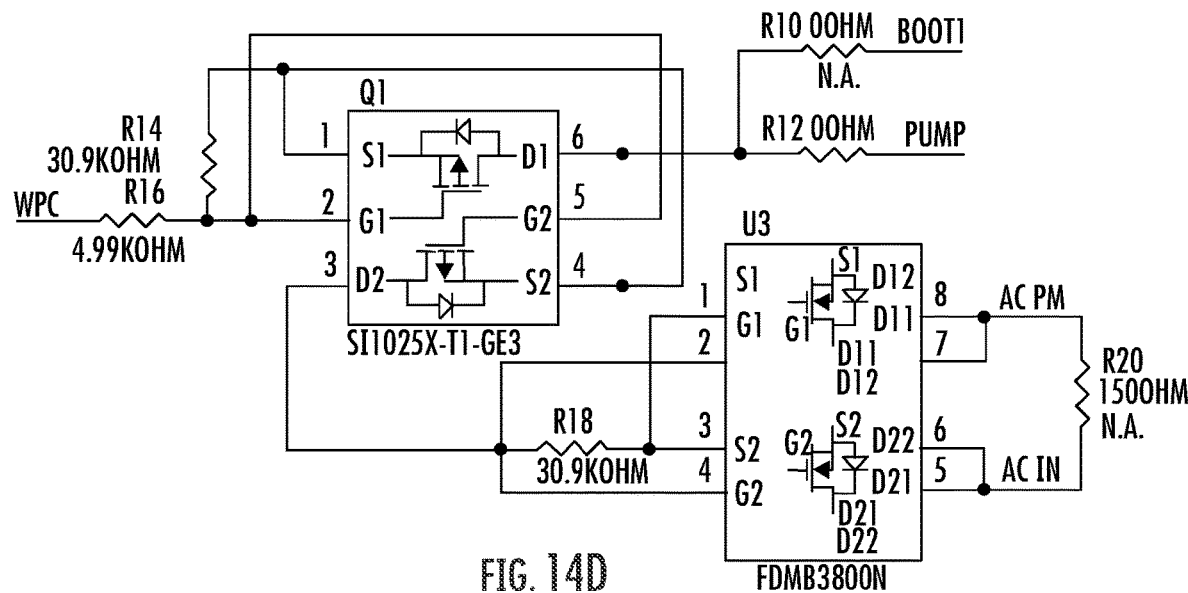
Figure 14E:
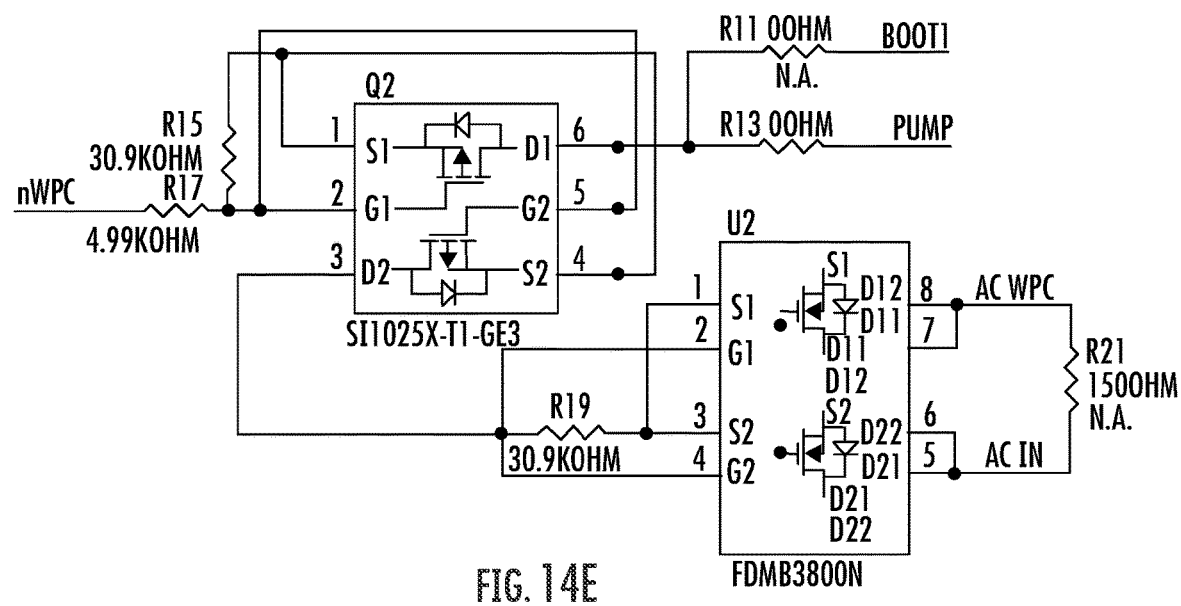
Figure 14F:
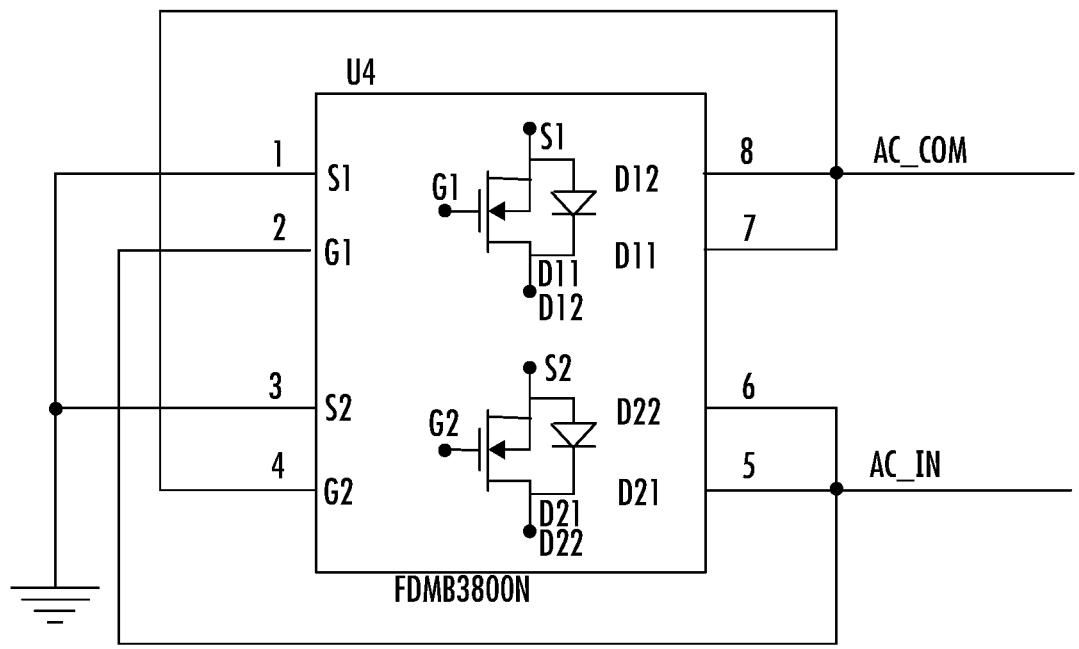
Figure 14G:
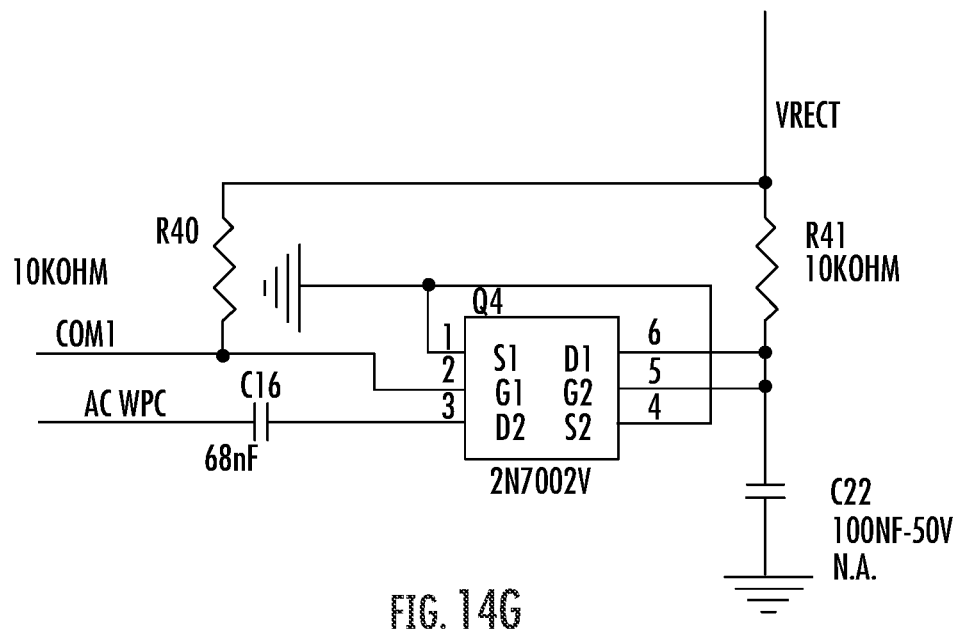
Figure 15:
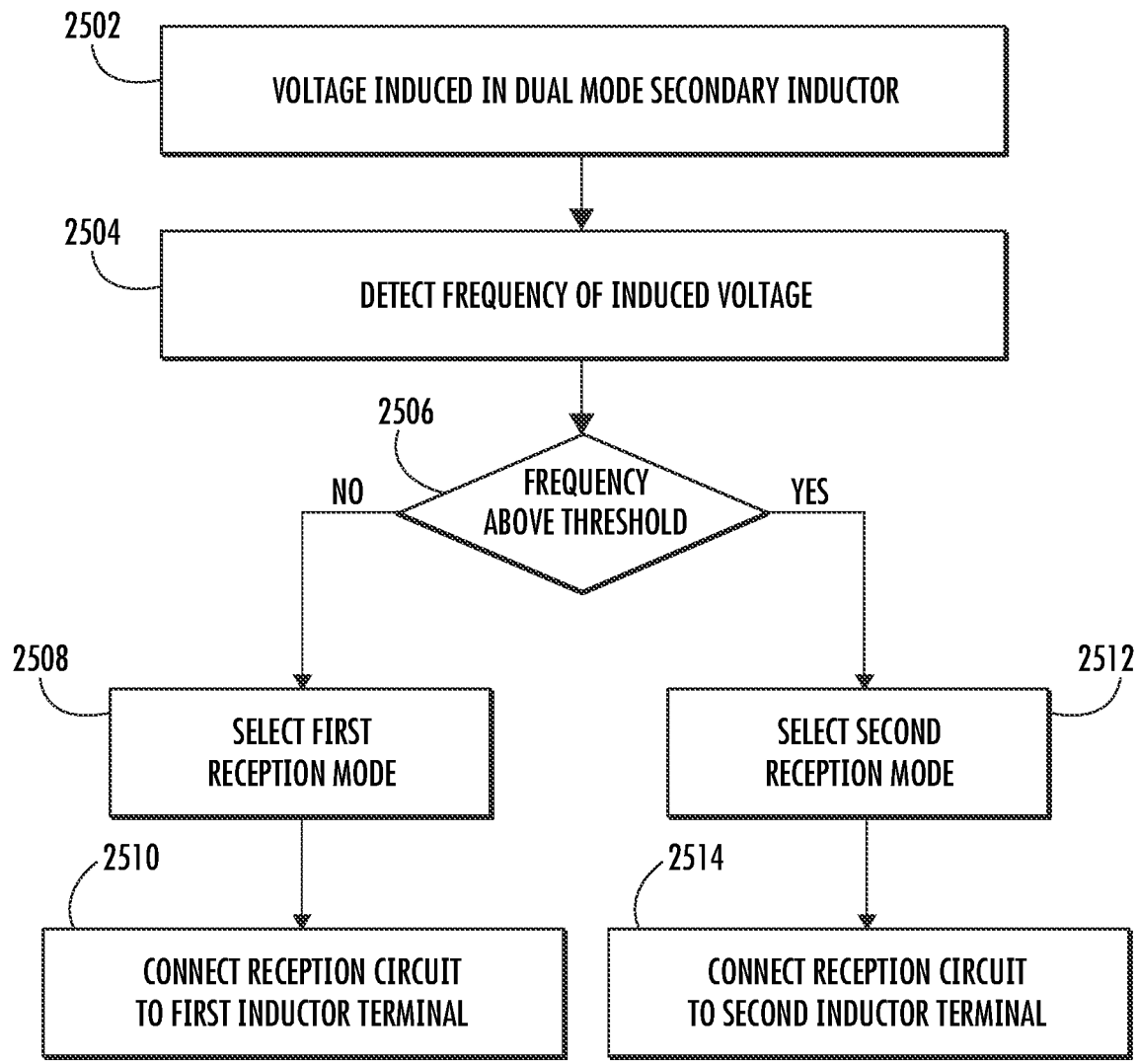

FIG. 3 presents a typical circuit diagram of the inductive power transfer system, in accordance with a selected embodiment of the present disclosure;

FIG. 4 shows a power converter of the driver device, in accordance with a selected embodiment of the present disclosure;

FIG. 5 shows an equivalent electronic circuit of the first half-bridge converter of the driver device, in accordance with a selected embodiment of the present disclosure;

FIGS. 6A and 6B present typical driver output voltages of the driver device operating in the first power mode and the second power mode, respectively, in accordance with a selected embodiment of the present disclosure;

FIG. 7 shows various operational power variations for the first and second power modes shown as a function of the transmission frequency, in accordance with a selected embodiment of the present disclosure;

FIG. 8 shows variations of an operational power at different power modes, as a function of the transmission frequency, in accordance with a selected embodiment of the present disclosure;

FIG. 9 presents further features of the inductive power transfer system, including a power monitor and feedback signal generator, in accordance with a selected embodiment of the present disclosure;

FIG. 10 presents a flow chart showing selected steps in a method for inductively transferring the electrical power to the electrical device, in accordance with a selected embodiment of the present disclosure;

FIG. 11 is a block diagram showing selected elements of an inductive power transfer system including a multi-mode inductive power receiver operable to receive power in a plurality of modes;

FIGS. 12A and 12B schematically represent a multi-inductance secondary inductor configured to operate selectively with more than one inductance value;

FIG. 13 is another block diagram showing selected elements of a particular multi-mode secondary receiver incorporating the multi-inductance secondary inductor of FIGS. 12A and 12B;

FIGS. 14A-G show various sections of a possible reception circuit for a multi-mode inductive power receiver; and FIG. 15 is a flowchart representing various actions of a method for selecting an operational mode of a multi-mode inductive power receiver.

DETAILED DESCRIPTION OF THE PREFERRED EMBODIMENT(S)

Figure 1:
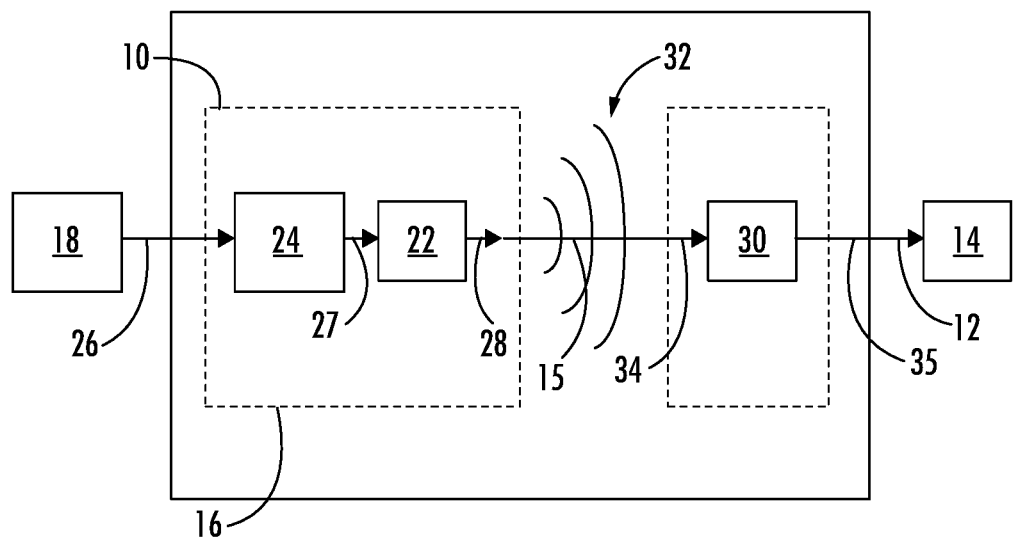
FIG. 1 shows an inductive power transfer system for providing electrical power to an electrical device, in accordance with a selected embodiment of the present disclosure.

Reference is now made to FIG. 1, which shows an inductive power transfer system 10 for providing electrical power 12 to an electrical device 14, in accordance with a selected embodiment of the present disclosure. The inductive power transfer system 10 includes, inter alia, an inductive power outlet unit 16 conductively coupled to a power supply 18, for example, a DC power supply and an inductive power receiver unit 20 conductively associated with the electrical device 14.

The inductive power outlet unit 16 includes, inter alia, a primary inductor 22 conductively associated with the power supply 18 via a driver device 24. The DC power supply 18 supplies a DC current 26 to the driver device 24. The driver device 24 is coupled to the primary inductor 22 and is configured to generate an AC voltage 27, by converting the input DC voltage 26 to an AC voltage 27 at a plurality of power levels, as described below. The AC voltage 27 is applied across the primary inductor 22, and an AC voltage 28 is inductively transferred to the secondary inductor 30 via an inductive communications channel 15. The frequency of the AC voltage 28 is determined by a toggling frequency, $f_T$, of the driver device 24, as described below. The toggling frequency, $f_T$, is selected such that the AC voltage 28 has a voltage transmission frequency f which is significantly different from the resonant frequency $f_R$ of the power inductive system 10.

The inductive power receiver unit 20, which is conductively associated with the electric device 14, includes, inter alia, a secondary inductor 30 inductively coupled 32 to the primary inductor 22 via the inductive communications channel 15. An AC voltage 34 is inductively transferred to the inductive power receiver unit 20 such that the electrical power 12, at the plurality of power levels, is supplied to the electrical device 14 via an electrical device input channel 35, in accordance with electrical power requirements of the electrical device 14.

In accordance with the selected embodiment of the present disclosure, the AC voltage 28 has a voltage transmission frequency, f, which is higher than the resonant frequency $f_R$ of the inductive power outlet unit 16, as described below.

It is appreciated that in alternative embodiments of the present disclosure, the voltage transmission frequency, f, may be selected in frequency ranges which are less than $f_R$.

Optionally, the electrical device 14 includes, inter alia, devices, such as a mobile communications device, a navigation system, a computing device, a laptop computer, a net-book, a tablet computer, an electronic reading device, a media player, or the like as well as any combination thereof.

Figure 2:
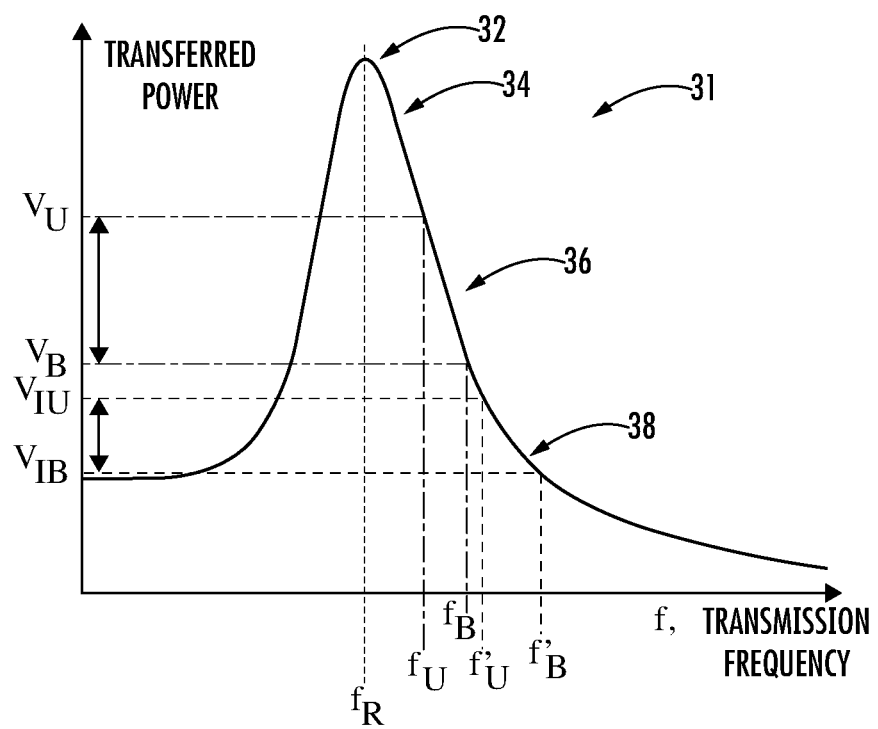
FIG. 2 shows a variation in the transferred AC power as a function of the AC transmission frequency, f, in accordance with a selected embodiment of the present disclosure.

Reference is now made to FIG. 2, which shows a variation 31 in the transferred AC power as a function of the AC transmission frequency, f, in accordance with a selected embodiment of the present disclosure. It is appreciated that the AC transmission frequency is substantially the same frequency as the toggling frequency of the driver device 24. FIG. 2 shows that the maximum power transfer 32 is achieved at the resonant frequency, $f_R$, of the inductive power transfer system 10, namely, the resonant frequency of the primary inductor 22 and the secondary inductor 30. However, due to power fluctuations, during power transmission, for example, due to changing environmental conditions and/or variations in alignment between the primary and secondary inductors, small variations in the transfer frequency results in large variations in the transferred power 34. Therefore, it is preferable to operate the inductive power transfer system 10 at transmission frequencies other than the resonant frequency, $f_R$.

In accordance with a selected embodiment of the current disclosure, a selected power transfer is in the power region in which the corresponding transfer frequency is in a non-resonance frequency region, 36. Varying the transmission frequency in the range $f_U$ to $f_B$, $\Delta f$, results in a variation in the transferred power transfer, $V_U$ to $V'_B$. Thus, any variations in the toggling frequency result in approximate changes in the transferred power result. This is in contrast to variations in the transmission frequency at the resonant frequency which result in large variations in the transferred power.

Alternatively, if a transmission frequency range, such as $f'_U$ to $f'_B$, is selected, a variation 38 in power transfer at a lower voltage $V'_U$ to $V_B$ may be obtained. Accordingly, the inductive power transfer system may transmit power at multiple power levels by adjusting the transmission frequency range.

Reference is now made to FIG. 3, which presents a typical circuit diagram 38 of the inductive power transfer system 10, in accordance with a particular embodiment of the present disclosure. FIG. 3 shows that the driver device 24 includes, inter alia, four electronic switches M1, M2, M3, and M4. Optionally, M1, M2 M3, and M4 are N-type MOFSET switches. The switches M1 and M2 are controlled by a microprocessor 50, such as LTC4442 High Speed Synchronous N-Channel MOFSET Driver, and the switches M3 and M4 are controlled by a microprocessor 52, such as LTC4442 High Speed Synchronous N-Channel MOFSET Driver. FIG. 3 shows that the driver device 24 includes, inter alia, an LC circuit 54. The LC circuit 54 includes, inter alia, the primary inductor (L1) 22 and a serially-connected capacitor (C2) 56. The primary inductor (L1) 22 is inductively coupled to the secondary inductor (L2) 30.

It is appreciated that the resonance frequency, $f_r$, is determined by the values of the components of the LC circuit 54 as well as the relative positioning of the primary inductor (L1) 22 and the secondary inductor (L2) 30. Optionally, the toggling frequency, $f_T$, is adjusted in incremental frequency steps, $\Delta f$, which may be selected from within a permissible range of approximately $f_U$ to $f_B$. A typical value of a frequency range $f_U$ to $f_B$ is 180 kHz to 380 kHz, respectively, in incremental frequency steps, $\Delta f$, 250 Hz.

FIG. 3 also shows that the secondary inductor 30 is conductively coupled to the electrical device 14 by an AC-DC rectifier 60. The rectifier 60 rectifies the transferred AC power 12 to the electrical device 14, in accordance with the electrical power requirements of the electrical device 14.

It is appreciated that the inclusion of the rectifier 60 in the power transfer system 10 is optional. If the electrical device 14 is an AC-operating device, the AC-DC rectifier 60 is excluded from the power transfer system 10.

It is further appreciated that the operation of the microprocessors 50 and 52 may be coordinated, for example for synchronized toggling.

Reference is now made to FIG. 4, which shows a power converter 62 of the driver device 24, in accordance with a selected embodiment of the present disclosure. FIG. 4 shows that the switching portion 62 includes, inter alia, the four electronic switches M1, M2, M3, and M4, which are conductively coupled to the DC power supply 18. The four switches M1, M2, M3, and M4 form a full-bridge (H-bridge) power inverter 64 for converting the DC voltage 26 into the AC voltage 28, which is inductively transferred to the power receiver unit 20.

The full-bridge power converter 64 includes a first half-bridge power converter 66 and a second half-bridge power converter 68. The first half-bridge converter 64 includes switches M1 and M2 and the second half-bridge converter 68 includes switches M3 and M4. The LC circuit 54 conductively links the first half-bridge converter 66 and the second half-bridge converter 68.

The first half-bridge converter 66 includes, inter alia, the first electronic switch M1 which is operable to selectively conductively couple an anode 72 (FIG. 3) of the DC power supply 18 to a first terminal 74 of the primary inductor 22. The second electronic switch M2 is operable to selectively conductively couple a cathode 76 (FIG. 3) of the DC power supply to the first terminal 74 of the primary inductor. The third electronic switch M3 is operable to selectively conductively couple the anode 72 (FIG. 3) of the DC power supply 18 to a second terminal 78 of the primary inductor 22. The fourth electronic switch M4 is operable to selectively conductively couple the cathode 76 of the DC power supply 18 to a second terminal of the primary inductor 22.

In order to generate the AC current 27 from the input DC current 26, the power inverter 46 toggles between a first operational state of the driver device 24 and a second operational state of the driver device 24. The toggling frequency, $f_T$, is controlled by the microprocessors 50 and 52.

In the first operational state, optionally, the first electronic switch M1 is operating in an ON-state, the second electronic switch M2 is operating in an OFF-state, the third electronic switch M3 is operating in an OFF-state, and the fourth electronic switch M4 is operating in an ON-state. Thus, in the first operational state, the voltage at the first terminal 74 is +V, volts, where V volts is the DC voltage generated at the anode 72. Furthermore, the DC voltage at a first plate 80 of the capacitor 56 is –V volts, and, therefore, the DC voltage at a second plate 82 is +V volts. Thus, the voltage at the second terminal 78 is –V volts and the total AC voltage variation across the inductance 54 is +V volts.

In the second operational state, optionally, the first electronic switch M1 is operating in an OFF-state, the second electronic switch M2 is operating in an ON-state, the third electronic switch M3 is operating in an ON-state, and the fourth electronic switch M4 is operating in an OFF-state. Thus, in the second operational state, the voltage at the first terminal 74 is –V, volts, the DC voltage at the first plate 80 of the capacitor 56 is +V volts, the DC voltage at the second plate 82 is –V volts, and the DC voltage at the second terminal 78 is +V volts and the total AC voltage variation across the inductance 54 is –V volts.

Thus, the total AC voltage variation across the inductance 54 is .±0.2V volts, and an AC voltage of approximately ±V volts is inductively transferred to the power receiver device 20. The AC voltage transferred to the electrical device 14 by means of the communications links 15 and 12 is therefore, approximately, ±V volts.

Therefore, by toggling the power inverter 64 between a first operational state and a second operational state, the AC voltage 28 of ±V volts is transferred to the electrical device 14 by means of the communications link 12.

It is appreciated that the variable DC power supply 18 generates the DC current 26 at a plurality of electrical power levels as a function of the AC transmission frequency, f (FIG. 2).

It is particularly noted that the inductive power transmission system may operate at a second power level by fixing electronic switch M3 in the OFF state and electronic switch M4 in the ON state and toggling only between electronic switch M1 and electronic switch M2. Therefore, electronic switch M1 and electronic switch M2 are effectively configured to operate as a half-bridge converter 66.

Reference is now made to FIG. 5, which shows an equivalent electronic circuit 90 of the switching portion 62 of the driver device 24, configured to operate at the second power level with electronic switch M3 fixed in the OFF state and electronic switch M4 fixed in the ON state.

The half-bridge converter 66 includes, inter alia, the two electronic switches M1 and M2 which are conductively coupled to the anode 72 of the variable DC power supply 18 for converting the DC voltage 26 into the AC voltage 27, which is inductively transferred to the power receiver unit 20.

In the second power mode, in order to generate the AC current 27 from the input DC current 26, at the second power mode, the power inverter 46 toggles between a first operational state of the driver device 24 and a second operational state of the driver device 24. The toggling frequency, $f_T$, is controlled by the microprocessors 50 and 52.

In the first operational state, optionally, the first electronic switch M1 is operable in an ON-state, the second electronic switch M2 is operable in an OFF-state, the third electronic switch M3 is operable in an OFF-state, and the fourth electronic switch M4 is operable in an ON-state. In the second operational state, the first electronic switch M1 is operable in an OFF-state, the second electronic switch M2 is operable in an ON-state, the third electronic switch M3 is operable in an OFF-state, and the fourth electronic switch M4 is operable in an ON-state.

In the second power mode, as shown in the equivalent circuit of FIG. 5, since the switch M3 is operating in an OFF-state, M3 is not participating in the operation of the half-bridge 66 and is thus excluded from FIG. 5. Furthermore, since M4 is operating in an ON-state, M4 is shown as a short circuit conductively coupled to ground.

In the first operational state of the second power mode, the first electronic switch M1 is operable in an ON-state, the second electronic switch M2 is operable in an OFF-state, the third electronic switch M3 is operable in an OFF-state, and the fourth electronic switch M4 is operable in an ON-state. Thus, in the first operational state, the voltage at the first terminal 74 is +V, volts, where V volts is the DC voltage generated at the anode 72. The DC voltage at the first plate 80 of the capacitor 56 is –V volts, and the DC voltage at the second plate 82 is +V volts. The voltage at the second terminal 78 is +V volts, and, thus, the total AC voltage variation across the inductance 54 is +V volts.

In the second operational state of the second power mode, the first electronic switch M1 is operable in an OFF-state, the second electronic switch M2 is operable in an ON-state, the third electronic switch M3 is operable in an OFF-state, and the fourth electronic switch M4 is operable in an ON-state. Thus, in the second operational state of the second power mode, the voltage at the first terminal 74 is –V volts, the DC voltage at the first plate 80 of the capacitor 56 is –V volts, and the DC voltage at the second plate 82 is +V volts. The voltage at the second terminal 78 is +V volts, and, thus, the total AC voltage variation across the inductance 54 is 0 V volts.

Thus, the total AC voltage variation across the inductance 54 is from 0 volts to +V volts.

Therefore, by toggling the first half-bridge 66 between the first operational state and the second operational state, in the second power mode, an AC voltage varying from 0 volts to +V volts, is transferred to the electrical device 14 by means of the communications links 15 and 12.

Accordingly, the second power mode (FIG. 5) produces a smaller voltage range than the first power mode (FIG. 4).

It is appreciated that the power requirements of the electrical device 14 are determined by the manufacturer.

Reference is now made to FIGS. 6A and 6B, which present typical driver output voltages of the driver device 24 operating in the first power mode (94) and the second power mode (96), respectively, in accordance with a selected embodiment of the present disclosure.

The voltage output 94 generated by the full-bridge converter 64 (FIG. 6A) is compared with a typical voltage variation 96 generated by the half-bridge 66 (FIG. 6B). FIG. 6A shows that the full-bridge converter 64 optionally generates a full-square-wave AC voltage of range ±2V volts, and FIG. 6B shows that the half-wave converter 66 optionally generates a half-square-wave voltage of range 0 volts to +V volts.

The voltage outputs 94 and 96 are shown as square-wave functions. It is appreciated that voltage outputs 94 and 96 have finite-rise times and finite-decay times.

Reference is now made to FIG. 7, in which operational power variations 100 for the first and second power modes are shown as a function of the transmission frequency, f, in accordance with the selected embodiment of the present disclosure. FIG. 7 shows a power variation 102 for the full-bridge converter 64 as a function of the transmission frequency, f, in a first power mode 104. FIG. 7 also shows a power variation 106 for the first half-bridge converter 66 as a function of the transmission frequency in a second power mode 108. In FIG. 7 it can be deduced that at the resonance frequency, $f_R$, the maximum voltage for the full-bridge converter 66 is approximately twice the maximum voltage of the half-bridge converter 64.

It is noted that the multipower inductive power transmission unit of the embodiment may allow power to be transmitted at multiple voltage ranges for a given transmission frequency range. Accordingly, by way of example, using a given transmission frequency range, such as $f_U$ to $f_B$, in the first power mode, power may be transmitted having a voltage range of $V_U$ to $V_B$. Whereas, in the second power mode, at the same frequency range $f_U$ to $f_B$ power may be transmitted at a lower voltage range $V_{1U}$ to $V_{1B}$.

It will be appreciated that it is a particular advantage of such an arrangement that the driver may be optimized to work efficiently at a single frequency range and yet to produce multiple power levels.

Thus, with the present embodiment, $V_U=2V_{1U}$ and $V_B=2V_{1B}$. Optionally, with the present embodiment, the power requirement of a second electrical device such as a mobile communication device is lower than the power requirement of the first electrical device such as a tablet computer for example.

Therefore, by operating the power converter 64 in power modes, different electrical devices are operable with the present disclosure.

Reference is now made to FIG. 8, which shows variations of an operational power 120 as a function of the transmission frequency, f, for another embodiment of the inductive power unit operable at further power modes 122. By varying the DC current a range of operational power levels as a function of the AC transmission frequency are available. Accordingly, FIG. 8 shows that several power level modes 124, 126, 128, and 130 may be obtainable, for example, by varying the DC current 26.

Reference is now made to FIG. 9, which presents further features of the inductive power transfer system 10, in accordance with another embodiment of the present disclosure. FIG. 9 shows that the inductive power transfer system 10 also includes a power monitor 140 which continually monitors the electrical power inductively transferred between the power outlet unit 16 and the electrical device 14. The power monitor 140 is coupled to the secondary inductor 30 via a communications link 142. The monitoring of the inductively transferred electrical power 12 by the monitor 140 ensures that the power transferred is the electrical power required by the electrical device 14 and is within the power requirements of the electrical device 14 as well as complying with safety requirements of the power transfer system 10 and the electrical device 14.

The power monitor 140 is coupled to the secondary inductor 30 by a communications link 142 and optionally, inductively monitors the electrical power 12 inductively transferred to the electrical device 14 by the inductive power transfer system 10. The power monitor 140 is coupled to a feedback signal generator 144 by a communications link 141 and forwards monitoring signals 143 to a feedback signal generator 144. In accordance with the monitoring signals 143, the feedback generator 144 generates a feedback signal 146. The monitor 140 generates an appropriate feedback signal 146 in accordance with the results of the monitoring of the transferred electrical power 12, as described below.

The feedback signal generator 144 forwards the feedback signal 146 to a transmitter 147 which modulates the feedback signal 146 to comply with the transmission requirements of a feedback communications channel 148. The transmitter 147 transmits a modulated signal 150 to a receiver 152, located within the power transfer outlet unit 16. The receiver 152 demodulates and processes the received signal 150. If the transferred power does not comply with the power requirements of the electrical device, the receiver 152 forwards an adjustment signal 154 to the driver device 24 by means of a communications link 156. On receiving the signal 154, the driver device 24 adjusts the toggling frequency, $f_T$, of the power bridge 64, so that the transferred power 12 complies with the power requirements of the electrical device 12 (FIG. 2).

The feedback communications channel 148 forwards a power transfer status by communications means, such as a magnetic inductive communications channel, an acoustic communications channel, an electromagnetic communications channel, such an RF communications channel, an IR communications channel and/or an optical communications channel, a Bluetooth communications channel, a WiFi communications channel, and any combination thereof.

It is appreciated that the transmitter 147 and the receiver 152 are selected in accordance with the requirements of the feedback communications channel 148.

It is also appreciated that the communications channel 148 is an independent communications channel and is remote from the electrical power transfer channel 35.

If the power monitor 140 senses that the transferred electrical power 12 is within a predetermined recommended power range of the electrical device 14, such as within the power range requirements recommended by the manufacturer, the power monitor 140 does not generate a monitoring signal 141 and the power transfer unit 10 maintains the current power level transferred to the electrical device 14.

It is further appreciated that if the electrical device 14 requires a DC supply, for example, a charging device for an electrochemical cell or the like, an AC-DC rectifier 60 is provided in order to rectify the induced AC current 34.

Referring back to FIG. 2 and in accordance with a selected embodiment of the current disclosure, the selected power transfer 12 between the inductive power transfer system 10 and the electrical device 14 is optionally in the approximately linear region 36. In the linear region 36 the power transfer range is from approximately from $V_U$ to $V_B$ with a corresponding frequency range of approximately $f_U$ to $f_B$, respectively. The voltage range $V_U$ to $V_B$ is within the manufacturer's recommendations.

If the monitor 40 senses that the transferred power 12 deviates from the recommended power requirements, the transferred power 12 is adjusted in order to maintain the recommended power supply to the electrical device 14.

If the monitor 140 senses that the transferred voltage 12 is out of the range $V_U$ to $V_B$, the monitor 140 forwards an appropriate monitoring signal 143 to the feedback generator 144. If the sensed voltage is greater than $V_U$, the monitor forwards the monitoring signal 143 to the feedback signal generator 144 for reducing the transferred power 12 to remain within the manufacturer's requirements. The feedback signal generator 144 generates a power-reducing signal 160 and forwards the signal 160 to the transmitter 147. The transmitter 147 modulates and transmits the signal 160 to the receiver 152. The receiver 152 demodulates and processes the signal 160 in order to generate the adjustment signal 154. The adjustment signal 154 is forwarded to the driver device 24. The driver device 24 receives the adjustment signal 154 and reduces the transferred power 12 by appropriately reducing the toggling frequency $f_T$.

If the monitor 140 senses that the transferred voltage 12 is out of the voltage range $V_U$ to $V_B$, the monitor 140 forwards an appropriate monitoring signal 143 to the feedback generator 144. If the sensed voltage is less than $V_B$, the monitor forwards the monitoring signal 143 to the feedback signal generator 144 for increasing the transferred power 12 to remain within the manufacturer's requirements. The feedback signal generator 144 generates a power-increasing signal 162 which is forwarded to the transmitter 147. The transmitter modulates and transmits the signal 162 to the receiver 152. The receiver 152 demodulates and processes the signal 162 and generates the adjustment signal 154. The adjustment signal 154 is forwarded to the driver device 24. The driver device 24 receives the adjustment signal 154 and increases the transferred power 12 by appropriately increasing the toggling frequency $f_T$.

Additionally, the power transfer system 10 includes, inter alia, a safety monitoring device 170 which continually monitors the operation of the power transfer supply system 10. If the monitor 170 senses that the electrical and/or temperature safety features of the system 10 are exceeded, the monitor device 170 ceases the operation of the power transfer supply system 10 by forwarding a stop-functioning signal 172 to the DC power supply 18 as well as forwarding an appropriate visual/audio warning signal 174 to a visual/acoustic display unit 176, via a communications link 178.

Reference is now made to FIG. 10, which presents a flow chart 500 for a method for inductively transferring the electrical power 12 to the electrical device 14.

In step 502, providing at least one inductive power outlet unit 16 including at least one primary inductor 22.

In step 504, conductively associating a driver device 24 with the variable DC power supply 18.

In step 506, providing a power inverter 64 for converting the DC voltage 26 to the AC voltage 28.

In step 508, configuring the driver device 24 to toggle between the toggling frequencies in order to provide the AC voltage 28 across the at least one primary inductor 22.

In step 510, configuring the power receiver unit 30 to inductively receive the AC voltage 28 and forward the electrical power 12 to the electrical device 14.

In step 512, generating a feedback signal in order to adjust the toggling frequency of the driver device 24 so that transferred electrical power is within the power requirements of the electrical device 14.

In the foregoing description, embodiments of the disclosure, including selected embodiments, have been presented for the purpose of illustration and description. They are not intended to be exhaustive or to limit the disclosure to the precise form disclosed. Obvious modifications or variations are possible in light of the above teachings. The embodiments were chosen and described to provide the best illustration of the principals of the disclosure and its practical application, and to enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth they are fairly, legally, and equitably entitled.

Aspects of the present disclosure further relate to an inductive power transfer system including a multi-mode inductive power receiver. The multi-mode inductive power receiver is operable in a plurality of different modes to use more than one control protocol such that it may be compatible with a variety of different inductive power outlets.

The multi-mode inductive power receiver may include a secondary inductor operable to inductively couple with a primary inductor associated with the inductive power outlet. Optionally, the secondary inductor may be configured to operate selectively with a plurality of inductance values as required. A mode selector may select the operating mode according to properties of the inductive power outlet, for example, initial transmission frequency or the like.

It is noted that the systems and methods of the disclosure herein may not be limited in its application to the details of construction and the arrangement of the components or methods set forth in the description or illustrated in the drawings and examples. The systems and methods of the disclosure may be capable of other embodiments or of being practiced or carried out in various ways. It is also noted that the multi-mode inductive power receiver may be incorporated into the inductive power transfer system of the disclosure as described in reference to FIGS. 1-10 (e.g., as the inductive power receiver unit 20 of FIG. 1).

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

Reference is made to the block diagram of FIG. 11, showing selected elements of an inductive power transfer system 101 including a multi-mode inductive power receiver 300 operable to receive power from an inductive power outlet 200.

The inductive power outlet 200 comprises a primary inductor 220 wired to a power source 240 via a driver 230. The driver 230 is operable to generate a voltage oscillating at a transmission frequency across the primary inductor 220. Accordingly, the driver may include various elements such as inverters, choppers, or the like such as described in the applicant's co-pending U.S. patent application Ser. No. 13/205,672, now U.S. Pat. No. 8,981,598.

The inductive power receiver 300 includes a secondary inductor 320 wired to an electric load 340 via a reception circuit 330. When in proximity with the primary inductor 220, the secondary inductor 320 is operable to inductively couple therewith. Accordingly, an AC voltage oscillating at the transmission frequency is induced in the secondary inductor.

The inductive power transfer system 101 may further include a signal transfer mechanism (not shown) for transferring feedback signals from the receiver 300 to the outlet 200 for the purposes of power regulation, identification, or the like. A variety of operating protocols are currently used for controlling power transfer, for example, in one possible protocol operates with a transmission voltage of 10 volts and with a transmission frequency varying between 110 kilohertz and 205 kilohertz. In another protocol with a higher transmission voltage of about 30 volts, the transmission frequency may vary between say about 277 kilohertz and 357 kilohertz, or between 232 kilohertz and 278 kilohertz. Another protocol is described in the applicant's co-pending U.S. patent application Ser. No. 13/205,672, now U.S. Pat. No. 8,981,598. Still, other protocols may be used.

It is particularly noted that the multi-mode inductive power receiver 300 is configured to be compatible with a plurality of protocols such that it may be compatible with a variety of inductive power outlets 200. Accordingly, the reception circuit 330 may include a mode selector 334 for selecting the required mode according to preferred protocol of the inductive power outlet 200 coupled thereto.

Where operating modes are characterized by operating frequency of the primary inductor 220, the reception circuit 330 may further include a frequency detector 332 for detecting the initial transmission frequency of the primary inductor 220. The mode selector 334 may be in communication with such a frequency detector 334 and operable to select operating mode according to the transmission frequency. For example, if an initial transmission frequency is below a threshold of, for example, 250 kilohertz, the protocol operating between 110-205 kilohertz may be selected, whereas if an initial transmission frequency is above the threshold, the protocol operating between 277-357 kilohertz may be selected. Similarly, if an initial transmission frequency is below a threshold of, for example, 210 kilohertz, the protocol operating between 110-205 kilohertz may be selected, whereas if an initial transmission frequency is above the threshold, the protocol operating between 232-278 may be selected. Furthermore, where required, the initial transmission frequency may be set to a characteristic level, possibly outside the general operating range, for the purposes of such selection.

Optionally, the secondary inductor 320 may be a dual mode secondary inductor configured to operate selectively with more than one inductance value as required. The mode selector may be operable to select the inductance value appropriate for a particular protocol. In particular, a lower impedance may be required for the protocol operating at 30 volts between 277-357 kilohertz, whereas a higher impedance may be required for the protocol operating at 10 volts between 110-205 kilohertz.

Referring now to FIGS. 12A and 12B, a schematic representation of a particular example of a multi-inductance secondary inductor 2200 is shown. The multi-inductance secondary inductor 2200 is configured to operate selectively with more than one inductance value.

The secondary inductor 2200 of the example comprises a coil 2202 of conducting material, such as copper metal for example, having three terminals 2210, 2212, 2214. The terminals may be connected to an inductive receiver circuit 330 (FIG. 11) selectively, so as to provide various inductance values as required.

The coil 2202 comprises a spiraled wire of conducting material 2202 having an inner end 2204 and an outer end 2206. The inner end 2204 of the spiraled wire is connected to an inner terminal 2210. The outer end 2206 of the spiraled wire is connected to an outer terminal 2214. It is a particular feature of the disclosure that a third intermediate terminal 2212 is connected to the spiraled point at some intermediate point 2208 between the inner end 2204 and the outer end 2206. Optionally the coil may comprise an inner spiral and an outer spiral with the inner end of the outer spiral juxtaposed against the outer end of the inner spiral and the intermediate terminal being connected to the juxtaposed wires such as shown in FIG. 12B.

Accordingly, the inductance of the coil 2200 between the inner terminal and the outer terminal is higher than the inductance of the coil 2200 between the intermediate terminal and the outer terminal Thus, the inductance of the coil may be adjusted by selecting which pair of terminals are connected the reception circuit.

In one particular example a copper coil may have a total of 14 windings between the inner terminal and the outer terminal. The inner diameter may be about 20 millimeters and the outer diameter may be about 33 millimeters. The intermediate terminal may be connected to a point 2208 such that there are eight windings between the intermediate terminal and the outer terminal. Accordingly, the inductance at 100 kilohertz and 1 volt between the inner terminal and the outer terminal is about 7.5 microhenries, and the inductance between the intermediate terminal and the outer terminal is about 3.2 microhenries. For the same coil the direct current resistance between the inner terminal and the outer terminal is about 298 micro-ohms, and the direct current resistance between the intermediate terminal and the outer terminal is about 188 micro-ohms.

Referring now to FIG. 13 another block diagram shows selected elements of a particular multi-mode secondary receiver 2000 incorporating a multi-inductance secondary inductor 2200 such as described hereinabove.

The multi-mode secondary receiver 2000 includes the multi-inductance secondary inductor 2200, a first resonant tuning circuit 2102, a second resonant tuning circuit 2104, an AC switch 2106, a dual mode receiver 2108, and a load 2110.

The multi-inductance secondary inductor 2200 includes three terminals. The outer terminal 2214 serves as a common terminal wired to the dual mode receiver 2108. The intermediate terminal 2212 serves as a first mode terminal, and the inner terminal 2210 serves as a second mode terminal.

The AC switch 2106 is operable to select the desired mode by selectively connect the dual mode receiver 2108 to the intermediate terminal 2212 via the first resonant tuning circuit 2102 or to the inner terminal 2210 via the second resonant tuning circuit 2104. Accordingly, the dual mode receiver 2108 may be connected to a first pair of terminals with a first inductance or a second pair of terminals with a second inductance.

The dual mode receiver 2108 includes a controller 2112, a rectifier 2114, and a voltage control circuit 2116. Accordingly, the dual mode receiver is operable to regulate the power transfer using whichever protocol is appropriate for the coupled inductive power outlet.

Referring now to electrical schematics of FIGS. 14A-G, various sections of a particular multi-mode inductive reception circuit are presented for illustrative purposes only. In particular, FIG. 14A represents a common terminal 402, a first mode terminal 404, and a second mode terminal 406. The first terminal 404 is connected to a first resonant tuning circuit 408 and a charge pump 412. The second mode terminal 406 is connected to the second resonant tuning circuit 410

FIG. 14B represents the controller 414 of the reception circuit, and such a controller may be an integrated circuit configured to select an operational mode and to perform power regulation accordingly. It is particularly noted that chip may include a frequency detector operable to output a signal WPC from pin number 7. The WPC signal may be used to select the mode via the AC switches of FIGS. 14D and 14E.

FIG. 14C represents a signal inverter configured to invert the WPC signal producing a zero nWPC signal if the WPC signal is in its ON state.

FIGS. 14D and 14E represent AC switches for the first mode and second mode, respectively.

The first mode AC switch of FIG. 14D includes a pair of N-channel FETs Q1 having a common source signal, and a pair of P-channel FETs U3 having a common gate signal. The pair of N-channel FETs are triggered by the WPC signal. The P-channel FETs and configured to connect the reception circuit controller AC IN to the first mode terminal AC PM of the secondary inductor. The common gate signal of the P-channel FETs is drawn from a charge pump via the pair of N-channel FETs.

The second mode AC switch of FIG. 14E includes a pair of N-channel FETs Q2 having a common source signal, and a pair of P-channel FETs U2 having a common gate signal. The pair of N-channel FETs are triggered by the nWPC signal. The P-channel FETs and configured to connect the reception circuit controller AC IN to the second mode terminal AC WPC of the secondary inductor. The common gate signal of the P-channel FETs is drawn from a charge pump via the pair of N-channel FETs.

It is noted that alternative AC switches may be used, for example, using complementary P-channel and N-channel FETs.

FIG. 14F shows a possible pair of rectifying MOSFETS which may be used in combination with rectifiers in the controller to rectify the AC current, for example, as described in the applicant's co-pending U.S. patent application Ser. No. 12/423,530, now U.S. Pat. No. 8,320,143, for example.

FIG. 14G shows a possible signal buffer for the feedback communication signal COM sent from the receiver to the outlet.

Referring now to the flowchart of FIG. 15 various actions are presented of a method for selecting operational mode of a multi-mode inductive power receiver. A voltage is induced in the secondary coil 2502, the operating frequency is detected 2504. The frequency is compared to a threshold value, such as 250 kilohertz, 210 kilohertz or the like 2506. If the operating frequency is above the threshold, a first operating mode is selected 2508 and the first mode terminal is connected to the reception circuit 2510. If the operating frequency is below the threshold, a second operating mode 2512 is selected, and the second mode terminal is connected to the reception circuit 2514. Other methods may be used.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server, and the like are intended to include all such new technologies a priori.

As used herein the term "about" refers to at least ±10%.

The terms "comprises", "comprising", "includes", "including", "having", and their conjugates mean "including but not limited to" and indicate that the components listed are included, but not generally to the exclusion of other components. Such terms encompass the terms "consisting of" and "consisting essentially of."

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an", and "the" may include plural references unless the context clearly dictates otherwise. For example, the term "a compound" or "at least one compound" may include a plurality of compounds, including mixtures thereof The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. An inductive power outlet for inductively powering a receiver, the inductive power outlet comprising:
   at least one inductor inductively coupled to a coil of the receiver having together a resonant frequency; and
   a driver comprising at least one switch, the driver being configured to:
      generate power in accordance with the at least one switch by converting a DC voltage supplied by a power supply to an AC voltage, a frequency of the AC voltage being different from the resonant frequency, and
      vary the frequency of the AC voltage to apply the AC voltage within a range of AC voltages across the at least one inductor.

2. The inductive power outlet of claim 1, wherein the driver is configured to regulate energy transmitted by the at least one inductor by adjusting a duty cycle of the AC voltage.

3. The inductive power outlet of claim 1, wherein the frequency of the AC voltage is either lower or higher than the resonant frequency.

4. The inductive power outlet of claim 1, wherein the at least one switch comprises at least two switches configured to collectively operate as a half-bridge rectifier to apply the AC voltage across the at least one inductor.

5. The inductive power outlet of claim 1, wherein the at least one switch comprises at least four switches configured to collectively operate as a full-bridge rectifier to apply the AC voltage across the at least one inductor.

6. The inductive power outlet of claim 5, wherein two of the four switches are set in a fixed off state while the remaining two of the four switches are set in an on to collectively operate as a half-bridge rectifier to apply the AC voltage across the at least one inductor.

7. The inductive power outlet of claim 1, wherein the inductive power outlet comprises a signal receiver configured to demodulate, and process a feedback signal received from the receiver.

8. The inductive power outlet of claim 7, wherein if a transferred power does not comply with power requirements of an electrical device, the signal receiver forwards an adjustment signal to the driver.

9. The inductive power outlet of claim 8, wherein the driver adjusts the frequency of the AC voltage in accordance with the adjustment signal.

10. The inductive power outlet of claim 1, wherein the inductive power outlet is configured to regulate the energy transmitted by the at least one inductor according to power requirements of the receiver.

11. The inductive power outlet of claim 1, wherein the driver is configured to select one of a plurality of power levels.

12. The inductive power outlet of claim 1, wherein the driver is configured to selectively activate a first switch combination of the at least one switch in accordance with a first power mode of the plurality of power levels.

* * * * *

UNITED STATES PATENT AND TRADEMARK OFFICE
CERTIFICATE OF CORRECTION

PATENT NO. : 11,626,760 B2
APPLICATION NO. : 17/825248
DATED : April 11, 2023
INVENTOR(S) : Arik Rofe et al.

It is certified that error appears in the above-identified patent and that said Letters Patent is hereby corrected as shown below:

On the Title Page

In Item (72), under "INVENTORS", in Column 1, Line 1, delete "Bet Hakerem" and insert -- Beit HaKerem --, therefor.

In Item (72), under "INVENTORS", in Column 1, Line 4, delete "Mataa" and insert -- Mata --, therefor.

In Item (72), under "INVENTORS", in Column 1, Line 6, delete "Modiin" and insert -- Modi'in --, therefor.

On Page 2, in Item (63), under "Related U.S. Application Data", in Column 1, Line 2, delete "2021," and insert -- 2021, now Pat. No. 11,626,759, --, therefor.

In the Drawings

In Fig. 15, Sheet 17 of 17, for Tag "2506", in Line 2, delete "THRESHOLD" and insert -- THRESHOLD? --, therefor.

In the Specification

In Column 1, Line 10, delete "2021," and insert -- 2021, now U.S. Pat. No. 11,349,353, --, therefor.

In Column 1, Line 11, delete "2021," and insert -- 2021, now U.S. Pat. No. 11,626,759, --, therefor.

In Column 2, Line 56, delete "MOFSET" and insert -- MOSFET --, therefor.

In Column 4, Line 57, delete "requirements," and insert -- requirements. --, therefor.

In Column 5, Lines 5-6, delete "MOFSET" and insert -- MOSFET --, therefor.

Signed and Sealed this
Twentieth Day of June, 2023

Katherine Kelly Vidal
*Director of the United States Patent and Trademark Office*

CERTIFICATE OF CORRECTION (continued)
U.S. Pat. No. 11,626,760 B2

In Column 6, Line 24, delete "or" and insert -- or in --, therefor.

In Column 6, Line 28, delete "or" and insert -- or in --, therefor.

In Column 7, Line 46, delete "is" and insert -- is an --, therefor.

In Column 8, Line 65, delete "V′B." and insert -- VB. --, therefor.

In Column 9, Line 6, delete "VB" and insert -- V′B --, therefor.

In Column 9, Line 15, delete "M2" and insert -- M2, --, therefor.

In Column 9, Line 15, delete "MOFSET" and insert -- MOSFET --, therefor.

In Column 9, Line 18, delete "MOFSET" and insert -- MOSFET --, therefor.

In Column 9, Line 20, delete "MOFSET" and insert -- MOSFET --, therefor.

In Column 9, Line 26, delete "fr," and insert -- fR, --, therefor.

In Column 13, Line 36, delete "an" and insert -- as an --, therefor.

In Column 13, Line 62, delete "is from" and insert -- is --, therefor.

In Column 13, Line 66, delete "monitor 40" and insert -- monitor 140 --, therefor.

In Column 15, Line 4, delete "principals" and insert -- principles --, therefor.

In Column 16, Line 1, delete "in one" and insert -- one --, therefor.

In Column 17, Line 30, delete "hereinabove." and insert -- herein above. --, therefor.

In Column 17, Line 62, delete "410" and insert -- 410. --, therefor.

In Column 18, Line 22, delete "ofN-channel" and insert -- of N-channel --, therefor.

In Column 19, Line 10, delete "thereof" and insert -- thereof. --, therefor.

In the Claims

In Column 20, Line 35, in Claim 1, delete "cornprising:" and insert -- comprising: --, therefor.

In Column 21, Line 3, in Claim 7, delete "demodulate," and insert -- demodulate --, therefor.